US008577972B1

(12) United States Patent
Heikes et al.

(10) Patent No.: US 8,577,972 B1
(45) **Date of Patent: *Nov. 5, 2013**

(54) METHODS AND SYSTEMS FOR CAPTURING AND MANAGING INSTANT MESSAGES

(75) Inventors: Brian D. Heikes, Ashburn, VA (US); Kristine Amber Krantz, Cincinnati, OH (US); Kelly Monroe Matthews, Bristow, VA (US); Russell Scott Medeiros, Ashburn, VA (US); Venkatesh Ramanathan, Herndon, VA (US); Richard W. Robinson, Reston, VA (US); Perry E. Roman, Arlington, VA (US); Edward L. Sears, Reston, VA (US); Andrew L. Wick, McLean, VA (US); Deborah R. Yurow, Arlington, VA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/689,699

(22) Filed: Jan. 19, 2010

Related U.S. Application Data

(63) Continuation of application No. 10/825,617, filed on Apr. 16, 2004, now Pat. No. 7,653,693.

(60) Provisional application No. 60/531,988, filed on Dec. 24, 2003, provisional application No. 60/500,369, filed on Sep. 5, 2003.

(51) Int. Cl.
*G06F 13/00* (2006.01)

(52) U.S. Cl.
USPC .......... 709/206

(58) Field of Classification Search
USPC .......... 709/206
See application file for complete search history.

(56) References Cited

U.S. PATENT DOCUMENTS

| | | | |
|---|---|---|---|
| 4,650,927 | A | 3/1987 | James |
| 4,817,129 | A | 3/1989 | Riskin |
| 4,837,798 | A | 6/1989 | Cohen et al. |
| 5,008,853 | A | 4/1991 | Bly et al. |
| 5,021,949 | A | 6/1991 | Morten et al. |
| 5,025,252 | A | 6/1991 | DeLuca et al. |
| 5,086,394 | A | 2/1992 | Shapira |
| 5,101,424 | A | 3/1992 | Clayto et al. |

(Continued)

FOREIGN PATENT DOCUMENTS

| | | |
|---|---|---|
| CN | 1348296 A | 5/2002 |
| DE | 10048653 | 4/2002 |

(Continued)

OTHER PUBLICATIONS

Ignite Software: Parent Tools Feature Set, “Parent Tools Features,” http://www.parent-tools.com/features.htm, Ignite Software, pp. 1-3, as accessed on Dec. 10, 2003.

(Continued)

*Primary Examiner* — Robert B Harrell
(74) *Attorney, Agent, or Firm* — Keller Jolley Preece

(57) ABSTRACT

Managing instant messages may include receiving instant messages created by or on behalf of one or more message sources for delivery to an intended recipient. From among the received instant messages, qualifying instant messages may be identified that satisfy a capture rule, and two or more of the qualifying instant messages may be captured. The intended recipient may be informed of the captured instant messages unobtrusively, and also may be enabled to manage the captured instant messages.

25 Claims, 11 Drawing Sheets

700
707
705
online presence
user
710
Instant Messaging System
715
capture interface
capture engine
725
720
rule engine
750
instant message source

(56) References Cited

U.S. PATENT DOCUMENTS 5,276,905 A 1/1994 Hurst
5,315,636 A 5/1994 Patel
5,329,619 A 7/1994 Page et al.
5,351,235 A 9/1994 Lahtinen
5,425,028 A 6/1995 Britton et al.
5,436,960 A 7/1995 Campana, Jr. et al.
5,438,611 A 8/1995 Campana, Jr. et al.
5,440,551 A 8/1995 Suzuki
5,448,566 A 9/1995 Richter et al.
5,448,567 A 9/1995 Dighe et al.
5,459,458 A 10/1995 Richardson et al.
5,479,472 A 12/1995 Campana, Jr. et al.
5,487,100 A 1/1996 Kane
5,491,800 A 2/1996 Goldsmith et al.
5,497,463 A 3/1996 Stein et al.
5,499,343 A 3/1996 Pettus
5,548,637 A 8/1996 Heller
5,557,320 A 9/1996 Krebs
5,559,949 A 9/1996 Reimer et al.
5,561,703 A 10/1996 Arledge et al.
5,568,536 A 10/1996 Tiller et al.
5,572,643 A 11/1996 Judson
5,579,472 A 11/1996 Keyworth, II et al.
5,590,133 A 12/1996 Billstrom et al.
5,592,538 A 1/1997 Kosowsky et al.
5,604,788 A 2/1997 Tett
5,608,786 A 3/1997 Gordon
5,615,336 A 3/1997 Robson et al.
5,619,648 A 4/1997 Canale et al.
5,625,670 A 4/1997 Campana, Jr. et al.
5,631,946 A 5/1997 Campana, Jr. et al.
5,634,129 A 5/1997 Dickinson
5,646,982 A 7/1997 Hogan et al.
5,673,308 A 9/1997 Akhavan
5,678,179 A 10/1997 Turcotte et al.
5,684,494 A 11/1997 Nathrath et al.
5,694,616 A 12/1997 Johnson
5,697,060 A 12/1997 Akahane
5,706,211 A 1/1998 Beletic et al.
5,706,501 A 1/1998 Horikiri et al.
5,710,884 A 1/1998 Dedrick
5,726,984 A 3/1998 Kubler et al.
5,737,726 A 4/1998 Cameron et al.
5,742,668 A 4/1998 Pepe et al.
5,742,905 A 4/1998 Pepe et al.
5,749,081 A 5/1998 Whiteis et al.
5,760,771 A 6/1998 Blonder et al.
5,761,196 A 6/1998 Ayerst et al.
5,764,916 A 6/1998 Busey et al.
5,771,280 A 6/1998 Johnson et al.
5,774,673 A 6/1998 Beuk
5,793,365 A 8/1998 Tang
5,793,762 A 8/1998 Penners et al.
5,796,394 A 8/1998 Wicks et al.
5,796,948 A 8/1998 Cohen
5,799,157 A 8/1998 Escallon
5,799,284 A 8/1998 Bourquin
5,802,466 A 9/1998 Gallant et al.
5,802,470 A 9/1998 Gaulke
5,812,865 A 9/1998 Theimer et al.
5,819,084 A 10/1998 Shapiro et al.
5,826,025 A 10/1998 Gramlich
5,835,089 A 11/1998 Skarbo et al.
5,835,722 A 11/1998 Bradshaw et al.
5,835,905 A 11/1998 Pirolli et al.
5,845,073 A 12/1998 Carlin et al.
5,845,300 A 12/1998 Comer et al.
5,864,684 A 1/1999 Nielsen
5,864,874 A 1/1999 Shapiro
5,867,162 A 2/1999 O'Leary
5,870,744 A 2/1999 Sprague
5,872,521 A 2/1999 Lopatukin et al.
5,878,219 A 3/1999 Vance, Jr. et al.
5,878,233 A 3/1999 Schloss
5,878,397 A 3/1999 Stille et al.
5,895,454 A 4/1999 Harrington
5,896,321 A 4/1999 Miller et al.
5,897,635 A 4/1999 Torres et al.
5,903,726 A 5/1999 Donovan et al.
5,913,032 A 6/1999 Schwartz et al.
5,933,477 A 8/1999 Wu
5,938,725 A 8/1999 Hara
5,940,379 A 8/1999 Startup et al.
5,940,488 A 8/1999 DeGrazia
5,944,791 A 8/1999 Scherpbier
5,946,616 A 8/1999 Schornack et al.
5,946,617 A 8/1999 Portaro et al.
5,946,629 A 8/1999 Sawyer et al.
5,946,630 A 8/1999 Willars et al.
5,950,193 A 9/1999 Kulkarni
5,960,074 A 9/1999 Clark
5,960,173 A 9/1999 Tang et al.
5,960,429 A 9/1999 Peercy et al.
5,961,620 A 10/1999 Trent et al.
5,966,663 A 10/1999 Gleason
5,970,122 A 10/1999 LaPorta et al.
5,974,446 A 10/1999 Sonnenreich et al.
5,978,673 A 11/1999 Alperovich et al.
5,987,113 A 11/1999 James
5,987,376 A 11/1999 Olson et al.
5,999,932 A 12/1999 Paul
6,006,331 A 12/1999 Chu et al.
6,014,429 A 1/2000 LaPorta et al.
6,020,884 A 2/2000 MacNaughton et al.
6,026,429 A 2/2000 Jones et al.
6,028,866 A 2/2000 Engel
6,038,451 A 3/2000 Syed et al.
6,041,311 A 3/2000 Chislenko et al.
6,049,533 A 4/2000 Norman et al.
6,064,723 A 5/2000 Cohn et al.
6,065,047 A 5/2000 Carpenter
6,065,056 A 5/2000 Bradshaw et al.
6,067,529 A 5/2000 Ray et al.
6,067,561 A 5/2000 Dillon
6,073,109 A 6/2000 Flores
6,073,138 A 6/2000 de l'Etraz et al.
6,076,100 A 6/2000 Cottrille et al.
6,081,829 A 6/2000 Sidana
6,081,830 A 6/2000 Schindler
6,088,435 A 7/2000 Barber
6,091,948 A 7/2000 Carr et al.
6,091,958 A 7/2000 Bergkvist et al.
6,092,049 A 7/2000 Chislenko et al.
6,112,078 A 8/2000 Sormunen et al.
6,112,181 A 8/2000 Shear et al.
6,115,455 A 9/2000 Picard
6,115,605 A 9/2000 Siccardo et al.
6,128,739 A 10/2000 Fleming, III
6,134,432 A 10/2000 Holmes et al.
6,134,582 A 10/2000 Kennedy
6,138,158 A 10/2000 Boyle et al.
6,141,545 A 10/2000 Begeja et al.
6,144,959 A 11/2000 Anderson
6,148,328 A 11/2000 Cuomo et al.
6,148,377 A 11/2000 Carter
6,157,618 A 12/2000 Boss et al.
6,161,130 A 12/2000 Horvitz et al.
6,167,256 A 12/2000 Yla-Outinen et al.
6,169,911 B1 1/2001 Wagner et al.
6,175,831 B1 1/2001 Weinreich et al.
6,175,859 B1 1/2001 Mohler
6,178,331 B1 1/2001 Holmes et al.
6,189,026 B1 2/2001 Birrell et al.
6,192,396 B1 2/2001 Kohler
6,195,354 B1 2/2001 Skalecki et al.
6,198,738 B1 3/2001 Chang et al.
6,199,099 B1 3/2001 Gershman et al.
6,199,103 B1 3/2001 Sakaguchi et al.
6,208,996 B1 3/2001 Ben-Shachar et al.
6,212,175 B1 4/2001 Harsch
6,212,548 B1 4/2001 DeSimone et al.
6,212,550 B1 4/2001 Segur
6,223,177 B1 4/2001 Tatham
6,237,027 B1 5/2001 Namekawa

(56) References Cited

U.S. PATENT DOCUMENTS 6,237,092 B1 5/2001 Hayes, Jr.
6,243,039 B1 6/2001 Elliot
6,243,714 B1 6/2001 Shapiro et al.
6,247,043 B1 6/2001 Bates
6,252,952 B1 6/2001 Kung et al.
6,256,516 B1 7/2001 Wagner et al.
6,259,911 B1 7/2001 Bims et al.
6,260,148 B1 7/2001 Aggarwal et al.
6,269,369 B1 7/2001 Robertson
6,282,435 B1 8/2001 Wagner et al.
6,292,743 B1 9/2001 Pu et al.
6,301,609 B1 10/2001 Aravamudan et al.
6,311,211 B1 10/2001 Shaw
6,324,541 B1 11/2001 de l'Etraz
6,327,590 B1 12/2001 Chidlovskii et al.
6,330,590 B1 12/2001 Cotten
6,334,111 B1 12/2001 Carrott
6,337,712 B1 1/2002 Shiota et al.
6,343,317 B1 1/2002 Glorikian
6,347,332 B1 2/2002 Malet
6,349,299 B1 2/2002 Spencer et al.
6,351,777 B1 2/2002 Simonoff
6,360,251 B1 3/2002 Fujita et al.
6,363,248 B1 3/2002 Silverman
6,366,907 B1 4/2002 Fanning
6,374,246 B1 4/2002 Matsuo
6,374,290 B1 4/2002 Scharber et al.
6,389,127 B1 5/2002 Vardi et al.
6,389,372 B1 5/2002 Glance et al.
6,392,669 B1 5/2002 Matoba et al.
6,393,464 B1 5/2002 Dieterman
6,393,465 B2 5/2002 Leeds
6,396,512 B1 5/2002 Nickerson
6,404,438 B1 6/2002 Hatlelid
6,405,035 B1 6/2002 Singh
6,415,318 B1 7/2002 Aggarwal
6,421,439 B1 7/2002 Liffick
6,421,675 B1 7/2002 Ryan
6,421,709 B1 7/2002 McCormick et al.
6,423,012 B1 7/2002 Kato et al.
6,425,012 B1 7/2002 Trovato et al.
6,430,602 B1 8/2002 Kay et al.
6,430,604 B1 8/2002 Ogle
6,434,599 B1 8/2002 Porter
6,442,591 B1 8/2002 Haynes et al.
6,446,119 B1 9/2002 Olah et al.
6,449,344 B1 9/2002 Goldfinger et al.
6,449,634 B1 9/2002 Capiel
6,457,044 B1 9/2002 IwaZaki
6,457,062 B1 9/2002 Pivowar
6,460,073 B1 10/2002 Asakura
6,463,471 B1 10/2002 Dreke et al.
6,466,918 B1 10/2002 Spiegel et al.
6,480,885 B1 11/2002 Olivier
6,483,913 B1 11/2002 Smith
6,484,196 B1 11/2002 Maurille
6,487,583 B1 11/2002 Harvey et al.
6,487,584 B1 11/2002 Bunney
6,493,703 B1 12/2002 Knight et al.
6,499,053 B1 12/2002 Marquette
6,505,167 B1 1/2003 Horvitz et al.
6,507,866 B1 1/2003 Barchi
6,512,570 B2 1/2003 Garfinkle et al.
6,512,930 B2 1/2003 Sandegren
6,519,629 B2 2/2003 Harvey et al.
6,519,639 B1 2/2003 Glasser et al.
6,529,903 B2 3/2003 Smith et al.
6,535,228 B1 3/2003 Bandaru et al.
6,539,421 B1 3/2003 Appelman et al.
6,542,500 B1 4/2003 Gerszberg et al.
6,549,933 B1 4/2003 Barrett et al.
6,549,937 B1 4/2003 Auerbach et al.
6,557,027 B1 4/2003 Cragun
6,564,213 B1 5/2003 Ortega et al.
6,564,261 B1 5/2003 Gudjonsson et al.
6,564,264 B1 5/2003 Creswell et al.
6,567,796 B1 5/2003 Yost et al.
6,567,807 B1 5/2003 Robles
6,571,234 B1 5/2003 Knight
6,583,799 B1 6/2003 Manolis et al.
6,584,494 B1 6/2003 Manabe et al.
6,594,673 B1 7/2003 Smith et al.
6,604,133 B2 8/2003 Aggarwal et al.
6,606,657 B1 8/2003 Zilberstein et al.
6,611,822 B1 8/2003 Beams
6,615,237 B1 9/2003 Kyne et al.
6,615,241 B1 9/2003 Miller et al.
6,618,747 B1 9/2003 Flynn et al.
6,625,423 B1 9/2003 Wang
6,636,733 B1 10/2003 Helferich
6,636,888 B1 10/2003 Bookspan et al.
6,640,218 B1 10/2003 Golding
6,640,223 B1 10/2003 Jones et al.
6,643,641 B1 11/2003 Snyder
6,643,669 B1 11/2003 Novak et al.
6,647,259 B1 11/2003 Boyle et al.
6,647,383 B1 11/2003 August
6,654,800 B1 11/2003 Rieger, III
6,658,095 B1 12/2003 Yoakum et al.
6,658,260 B2 12/2003 Knotts
6,665,715 B1 12/2003 Houri
6,677,968 B1 1/2004 Appelman
6,678,719 B1 1/2004 Stimmel
6,684,240 B1 1/2004 Goddard
6,687,362 B1 2/2004 Lindquist et al.
6,687,739 B2 2/2004 Anupam
6,687,745 B1 2/2004 Franco et al.
6,691,162 B1 2/2004 Wick
6,694,353 B2 2/2004 Sommerer
6,697,807 B2 2/2004 McGeachie
6,697,824 B1 2/2004 Bowman-Amuah
6,697,840 B1 2/2004 Godefroid
6,699,125 B2 3/2004 Kirmse et al.
6,701,343 B1 3/2004 Kenyon
6,701,348 B2 3/2004 Sommerer
6,701,351 B1 3/2004 Gann
6,704,727 B1 3/2004 Kravets
6,708,205 B2 3/2004 Sheldon et al.
6,711,565 B1 3/2004 Subramaniam
6,714,519 B2 3/2004 Luzzatti et al.
6,714,791 B2 3/2004 Friedman
6,714,793 B1 3/2004 Carey et al.
6,721,784 B1 4/2004 Leonard et al.
6,728,357 B2 4/2004 O'Neal et al.
6,731,308 B1 5/2004 Tang
6,732,103 B1 5/2004 Strick et al.
6,732,155 B2 5/2004 Meek
6,732,185 B1 5/2004 Reistad
6,750,881 B1 6/2004 Appelman
6,751,603 B1 6/2004 Bauer et al.
6,754,904 B1 6/2004 Cooper et al.
6,757,365 B1 6/2004 Bogard
6,757,531 B1 6/2004 Haaramo
6,760,580 B2 7/2004 Robinson et al.
6,760,753 B1 7/2004 Ohgushi et al.
6,760,754 B1 7/2004 Isaacs et al.
6,772,188 B1 8/2004 Cloutier
6,781,608 B1 8/2004 Crawford
6,782,414 B1 8/2004 Xue et al.
6,785,554 B1 8/2004 Amerga
6,788,769 B1 9/2004 Waites
6,799,039 B2 9/2004 Wu et al.
6,800,031 B2 10/2004 Di Cesare
6,801,659 B1 10/2004 O'Dell
6,807,562 B1 10/2004 Pennock et al.
6,816,884 B1 11/2004 Summers
6,829,607 B1 12/2004 Tafoya et al.
6,832,245 B1 12/2004 Isaacs
6,839,554 B2 1/2005 McDowell
6,839,735 B2 1/2005 Wong et al.
6,839,737 B1 1/2005 Friskel
6,848,008 B1 1/2005 Sevanto et al.
6,848,542 B2 2/2005 Gailey et al.
6,853,982 B2 2/2005 Smith et al.

(56) References Cited

U.S. PATENT DOCUMENTS 6,854,007 B1 2/2005 Hammond
6,856,999 B2 2/2005 Flanagin et al.
6,895,426 B1 5/2005 Cortright et al.
6,898,626 B2 5/2005 Ohashi
6,901,398 B1 5/2005 Horvitz et al.
6,901,559 B1 5/2005 Blum
6,904,026 B1 6/2005 Tarnanen et al.
6,907,243 B1 6/2005 Patel
6,912,505 B2 6/2005 Linden et al.
6,912,563 B1 6/2005 Parker
6,912,564 B1 6/2005 Appelman et al.
6,917,813 B2 7/2005 Hilzondo
6,917,965 B2 7/2005 Gupta et al.
6,920,478 B2 7/2005 Mendiola et al.
6,925,469 B2 8/2005 Headings et al.
6,931,419 B1 8/2005 Lindquist
6,934,367 B1 8/2005 LaPierre et al.
6,952,805 B1 10/2005 Tafoya et al.
6,957,077 B2 10/2005 Dehlin
6,985,943 B2 1/2006 Deryugin et al.
6,990,628 B1 1/2006 Palmer et al.
6,993,325 B1 1/2006 Wasterlid
6,999,566 B1 2/2006 Eason et al.
6,999,959 B1 2/2006 Lawrence et al.
7,003,551 B2 2/2006 Malik
7,007,008 B2 2/2006 Goel et al.
7,007,228 B1 2/2006 Carro
7,010,312 B1 3/2006 Zechlin
7,016,978 B2 3/2006 Malik et al.
7,020,849 B1 3/2006 Chen
7,031,961 B2 4/2006 Pitkow et al.
7,032,007 B2 4/2006 Fellenstein et al.
7,035,865 B2 4/2006 Doss et al.
7,035,926 B1 4/2006 Cohen et al.
7,039,639 B2 5/2006 Brezin
7,054,918 B2 5/2006 Poleyn
7,058,036 B1 6/2006 Yu et al.
7,058,690 B2 6/2006 Machiro
7,058,892 B1 6/2006 MacNaughton et al.
7,065,186 B1 6/2006 Myers et al.
7,068,769 B1 6/2006 Weaver et al.
7,076,504 B1 7/2006 Handel
7,076,546 B1 7/2006 Bates et al.
7,080,139 B1 7/2006 Briggs et al.
7,082,407 B1 7/2006 Bezos et al.
7,089,237 B2 8/2006 Turnbull et al.
7,092,952 B1 8/2006 Wilens
7,092,998 B2 8/2006 Frietas
7,096,009 B2 8/2006 Mousseau et al.
7,096,030 B2 8/2006 Huomo
7,096,214 B1 8/2006 Bharat et al.
7,113,803 B2 9/2006 Dehlin
7,117,254 B2 10/2006 Lunt et al.
7,124,123 B1 10/2006 Roskind et al.
7,127,232 B2 10/2006 O'Neil et al.
7,130,956 B2 10/2006 Rao
7,133,506 B1 11/2006 Smith
7,133,898 B1 11/2006 Malik
7,136,903 B1 11/2006 Phillips
7,139,806 B2 11/2006 Hayes et al.
7,142,642 B2 11/2006 McClelland et al.
7,146,404 B2 12/2006 Kay et al.
7,146,416 B1 12/2006 Yoo et al.
7,162,528 B1 1/2007 Simonoff
7,177,880 B2 2/2007 Ruvolo
7,181,498 B2 2/2007 Zhu et al.
7,185,059 B2 2/2007 Daniell et al.
7,188,143 B2 3/2007 Szeto
7,188,153 B2 3/2007 Lunt et al.
7,190,956 B2 3/2007 Dorenbosch et al.
7,194,516 B2 3/2007 Giacobbe et al.
7,200,634 B2 4/2007 Mendiola et al.
7,203,507 B2 4/2007 Smith et al.
7,206,814 B2 4/2007 Kirsch
7,218,921 B2 5/2007 Mendiola et al.
7,231,428 B2 6/2007 Teague
7,231,478 B2 6/2007 Leijten
7,237,002 B1 6/2007 Estrada
7,240,093 B1 7/2007 Danieli et al.
7,246,371 B2 7/2007 Diacakis et al.
7,257,639 B1 8/2007 Li et al.
7,269,590 B2 9/2007 Hull et al.
7,269,627 B2 9/2007 Knauerhase
7,275,215 B2 9/2007 Werndorfer et al.
7,297,110 B2 11/2007 Goyal et al.
7,299,257 B2 11/2007 Boyer et al.
7,305,624 B1 12/2007 Siegel
7,313,760 B2 12/2007 Grossman
7,319,882 B2 1/2008 Mendiola et al.
7,324,826 B2 1/2008 Carey et al.
7,337,219 B1 2/2008 Meenan et al.
7,370,035 B2 5/2008 Gross et al.
7,383,339 B1 6/2008 Meenan et al.
7,401,098 B2 7/2008 Baker
7,411,939 B1 8/2008 Lamb et al.
7,424,510 B2 9/2008 Gross et al.
7,428,580 B2 9/2008 Hullfish et al.
7,428,585 B1 9/2008 Owens et al.
7,499,973 B2 3/2009 Couts et al.
7,512,407 B2 3/2009 Wu et al.
7,543,243 B2 6/2009 Schwartz et al.
7,552,460 B2 6/2009 Goldman
7,613,776 B1 11/2009 Ben-Yoseph
7,640,306 B2 12/2009 Appleman et al.
7,675,903 B2 3/2010 Ozugur et al.
7,680,796 B2 3/2010 Yeh et al.
7,716,287 B2 5/2010 Appleman et al.
7,725,542 B2 5/2010 Daniell et al.
7,774,711 B2 8/2010 Valeski
8,055,675 B2 11/2011 Higgins et al.
8,117,265 B2 2/2012 Ben-Yoseph
2001/0002469 A1 5/2001 Bates et al.
2001/0003202 A1 6/2001 Mache et al.
2001/0003203 A1 6/2001 Mache
2001/0005861 A1 6/2001 Mousseau
2001/0013050 A1 8/2001 Shah
2001/0013069 A1 8/2001 Shah
2001/0016823 A1 8/2001 Richards et al.
2001/0018858 A1 9/2001 Dwek
2001/0025280 A1 9/2001 Mandato et al.
2001/0034224 A1 10/2001 McDowell et al.
2001/0048735 A1 12/2001 O'Neal
2002/0002586 A1 1/2002 Rafal et al.
2002/0006803 A1 1/2002 Mendiola et al.
2002/0007398 A1 1/2002 Mendiola et al.
2002/0016818 A1 2/2002 Kirani et al.
2002/0021307 A1 2/2002 Glenn et al.
2002/0023132 A1 2/2002 Tornabene et al.
2002/0023147 A1 2/2002 Kovacs et al.
2002/0029224 A1 3/2002 Carlsson
2002/0032729 A1 3/2002 Erickson et al.
2002/0032742 A1 3/2002 Anderson
2002/0035605 A1 3/2002 McDowell et al.
2002/0042830 A1 4/2002 Bose et al.
2002/0046243 A1 4/2002 Morris
2002/0049610 A1 4/2002 Gropper
2002/0049704 A1 4/2002 Vanderveldt et al.
2002/0049751 A1 4/2002 Chen et al.
2002/0049806 A1 4/2002 Gatz et al.
2002/0049847 A1 4/2002 McArdle et al.
2002/0049852 A1 4/2002 Lee et al.
2002/0052921 A1 5/2002 Morkel
2002/0054092 A1 5/2002 Hedloy
2002/0059379 A1 5/2002 Harvey et al.
2002/0059401 A1 5/2002 Austin
2002/0059425 A1 5/2002 Belfiore et al.
2002/0059526 A1 5/2002 Dillon et al.
2002/0065828 A1 5/2002 Goodspeed
2002/0065856 A1 5/2002 Kisiel
2002/0065894 A1 5/2002 Dalal et al.
2002/0071539 A1 6/2002 Diament et al.
2002/0078077 A1 6/2002 Baumann et al.
2002/0083127 A1 6/2002 Agrawal
2002/0083136 A1 6/2002 Whitten, II

(56) References Cited

U.S. PATENT DOCUMENTS

2002/0084888 A1 7/2002 Jin
2002/0087630 A1 7/2002 Wu
2002/0087704 A1 7/2002 Chesnais et al.
2002/0091667 A1 7/2002 Jaipuria
2002/0091936 A1 7/2002 Tema
2002/0095663 A1 7/2002 Joory
2002/0097856 A1 7/2002 Wullert, II
2002/0103801 A1 8/2002 Lysons
2002/0112181 A1 8/2002 Smith
2002/0116461 A1 8/2002 Diacakis et al.
2002/0116463 A1 8/2002 Hart
2002/0116528 A1 8/2002 Vale
2002/0116641 A1 8/2002 Mastrianni
2002/0118809 A1 8/2002 Eisenberg
2002/0119789 A1 8/2002 Friedman
2002/0120687 A1 8/2002 Diacakis et al.
2002/0120697 A1 8/2002 Generous et al.
2002/0120779 A1 8/2002 Teeple et al.
2002/0123328 A1 9/2002 Snip et al.
2002/0123988 A1 9/2002 Dean et al.
2002/0128047 A1 9/2002 Gates
2002/0130904 A1 9/2002 Becker et al.
2002/0133369 A1 9/2002 Johnson
2002/0136390 A1 9/2002 Lang et al.
2002/0137530 A1 9/2002 Karve
2002/0138650 A1 9/2002 Yamamoto et al.
2002/0143565 A1 10/2002 Headings et al.
2002/0144283 A1 10/2002 Headings et al.
2002/0151294 A1 10/2002 Kirby et al.
2002/0154178 A1 10/2002 Barnett et al.
2002/0155826 A1 10/2002 Robinson et al.
2002/0160757 A1 10/2002 Shavit et al.
2002/0160805 A1 10/2002 Laitinen et al.
2002/0165000 A1 11/2002 Fok
2002/0165729 A1 11/2002 Kuebert et al.
2002/0169748 A1 11/2002 Macholda
2002/0174050 A1 11/2002 Eynard et al.
2002/0174260 A1 11/2002 Huang
2002/0175953 A1 11/2002 Lin
2002/0178072 A1 11/2002 Gusler et al.
2002/0178161 A1 11/2002 Brezin et al.
2002/0181703 A1 12/2002 Logan et al.
2002/0184089 A1 12/2002 Tsou et al.
2002/0184128 A1 12/2002 Holtsinger
2002/0184309 A1 12/2002 Danker et al.
2002/0188620 A1 12/2002 Doss et al.
2002/0199095 A1 12/2002 Bandini et al.
2003/0004855 A1 1/2003 Dutta
2003/0004872 A1 1/2003 Gardi et al.
2003/0009385 A1 1/2003 Tucciarone et al.
2003/0009698 A1 1/2003 Lindeman et al.
2003/0014485 A1 1/2003 Banatwala
2003/0018704 A1 1/2003 Polychronidis et al.
2003/0018726 A1 1/2003 Low et al.
2003/0018747 A1 1/2003 Herland et al.
2003/0023681 A1 1/2003 Brown et al.
2003/0023684 A1 1/2003 Brown et al.
2003/0023692 A1 1/2003 Moroo
2003/0023875 A1 1/2003 Hursey
2003/0025824 A1 2/2003 Ishikawa
2003/0028524 A1 2/2003 Keskar
2003/0028595 A1 2/2003 Vogt et al.
2003/0028597 A1 2/2003 Salmi
2003/0037112 A1 2/2003 Fitzpatrick
2003/0037114 A1 2/2003 Nishio et al.
2003/0042306 A1 3/2003 Irwin
2003/0045272 A1 3/2003 Burr
2003/0046097 A1 3/2003 LaSalle et al.
2003/0050916 A1 3/2003 Ortega
2003/0050976 A1 3/2003 Bolck
2003/0051161 A1 3/2003 Smith et al.
2003/0054830 A1 3/2003 Williams et al.
2003/0055831 A1 3/2003 Ryan
2003/0055897 A1 3/2003 Brown et al.
2003/0058478 A1 3/2003 Aoki
2003/0060211 A1 3/2003 Chern
2003/0064422 A1 4/2003 McDevitt
2003/0065721 A1 4/2003 Roskind
2003/0078981 A1 4/2003 Harms et al.
2003/0078987 A1 4/2003 Serebrennikov et al.
2003/0079024 A1 4/2003 Hough et al.
2003/0081001 A1 5/2003 Munro
2003/0083046 A1 5/2003 Mathis
2003/0087632 A1 5/2003 Sagi et al.
2003/0088554 A1 5/2003 Ryan
2003/0101226 A1 5/2003 Quine
2003/0101343 A1 5/2003 Eaton et al.
2003/0105682 A1 6/2003 Dicker et al.
2003/0105820 A1 6/2003 Haims et al.
2003/0105822 A1 6/2003 Gusler
2003/0106054 A1 6/2003 Billmaier et al.
2003/0110056 A1 6/2003 Berghofer et al.
2003/0110212 A1 6/2003 Lewis
2003/0119561 A1 6/2003 Hatch et al.
2003/0126267 A1 7/2003 Gutta et al.
2003/0129969 A1 7/2003 Rucinski
2003/0130014 A1 7/2003 Rucinski
2003/0131061 A1 7/2003 Newton
2003/0131143 A1 7/2003 Myers
2003/0154254 A1 8/2003 Awasthi
2003/0154257 A1 8/2003 Hantsch et al.
2003/0154373 A1 8/2003 Shimada et al.
2003/0154398 A1 8/2003 Eaton et al.
2003/0156138 A1 8/2003 Vronay et al.
2003/0156707 A1 8/2003 Brown et al.
2003/0158855 A1 8/2003 Farnham et al.
2003/0158860 A1 8/2003 Caughey
2003/0158864 A1 8/2003 Samn
2003/0158902 A1 8/2003 Volach
2003/0167310 A1 9/2003 Moody et al.
2003/0167324 A1 9/2003 Farnham et al.
2003/0172349 A1 9/2003 Katayama
2003/0174164 A1 9/2003 Capps
2003/0177175 A1 9/2003 Worley et al.
2003/0177190 A1 9/2003 Moody et al.
2003/0179930 A1 9/2003 O'Dell et al.
2003/0185232 A1 10/2003 Moore et al.
2003/0187813 A1 10/2003 Goldman
2003/0188263 A1 10/2003 Bates et al.
2003/0191673 A1 10/2003 Cohen
2003/0191753 A1 10/2003 Hoch
2003/0191969 A1 10/2003 Katsikas
2003/0197729 A1 10/2003 Denoue et al.
2003/0200272 A1 10/2003 Campise et al.
2003/0204741 A1 10/2003 Schoen et al.
2003/0206195 A1 11/2003 Matsa et al.
2003/0206619 A1 11/2003 Curbow et al.
2003/0208545 A1 11/2003 Eaton et al.
2003/0208547 A1 11/2003 Branimir
2003/0210265 A1 11/2003 Haimberg
2003/0212745 A1 11/2003 Caughey
2003/0217109 A1 11/2003 Ordille et al.
2003/0220946 A1 11/2003 Malik
2003/0220976 A1 11/2003 Malik
2003/0225834 A1 12/2003 Lee et al.
2003/0225836 A1 12/2003 Lee et al.
2003/0225850 A1 12/2003 Teague
2003/0227487 A1 12/2003 Hugh
2003/0227894 A1 12/2003 Wang et al.
2003/0228908 A1 12/2003 Caiafa et al.
2003/0229668 A1 12/2003 Malik
2003/0229717 A1 12/2003 Teague
2003/0233265 A1 12/2003 Lee et al.
2003/0233413 A1 12/2003 Becker
2003/0233416 A1 12/2003 Beyda
2003/0233417 A1 12/2003 Beyda et al.
2003/0233418 A1 12/2003 Goldman
2003/0233650 A1 12/2003 Zaner et al.
2004/0001480 A1 1/2004 Tanigawa et al.
2004/0003041 A1 1/2004 Moore et al.
2004/0003046 A1 1/2004 Grabelsky et al.
2004/0003071 A1 1/2004 Mathew et al.
2004/0010808 A1 1/2004 deCarmo
2004/0017396 A1 1/2004 Werndorfer et al.

(56) References Cited

U.S. PATENT DOCUMENTS

2004/0019637 A1 1/2004 Goodman et al.
2004/0019645 A1 1/2004 Goodman et al.
2004/0019650 A1 1/2004 Auvenshine
2004/0019671 A1 1/2004 Metz
2004/0019695 A1 1/2004 Fellenstein et al.
2004/0024478 A1 2/2004 Hans et al.
2004/0024822 A1 2/2004 Werndorfer et al.
2004/0029567 A1 2/2004 Timmins et al.
2004/0029572 A1 2/2004 Nerot
2004/0030741 A1 2/2004 Wolton et al.
2004/0030750 A1 2/2004 Moore et al.
2004/0031058 A1 2/2004 Reisman
2004/0044536 A1 3/2004 Fitzpatrick et al.
2004/0044723 A1 3/2004 Bell et al.
2004/0044736 A1 3/2004 Austin-Lane et al.
2004/0052356 A1 3/2004 McKinzie et al.
2004/0054646 A1 3/2004 Daniell et al.
2004/0054729 A1 3/2004 Fukuizumi et al.
2004/0054733 A1 3/2004 Weeks
2004/0054735 A1 3/2004 Daniell et al.
2004/0054736 A1 3/2004 Daniell
2004/0056901 A1 3/2004 March
2004/0059708 A1 3/2004 Dean et al.
2004/0059781 A1 3/2004 Yoakum et al.
2004/0064586 A1 4/2004 Weigand
2004/0073643 A1 4/2004 Hayes et al.
2004/0078440 A1 4/2004 Potter et al.
2004/0078445 A1 4/2004 Malik
2004/0092272 A1 5/2004 Valloppillil
2004/0092273 A1 5/2004 Valloppillil
2004/0098491 A1 5/2004 Costa-Requena et al.
2004/0103156 A1 5/2004 Quillen et al.
2004/0107119 A1 6/2004 Ohishi
2004/0117443 A1 6/2004 Barsness
2004/0117451 A1 6/2004 Chung
2004/0117831 A1 6/2004 Ellis et al.
2004/0122681 A1 6/2004 Ruvolo
2004/0122810 A1 6/2004 Mayer
2004/0122855 A1 6/2004 Ruvolo
2004/0122901 A1 6/2004 Sylvain
2004/0133564 A1 7/2004 Gross et al.
2004/0141599 A1 7/2004 Tang et al.
2004/0143564 A1 7/2004 Gross et al.
2004/0148347 A1 7/2004 Appelman et al.
2004/0152477 A1 8/2004 Wu et al.
2004/0152517 A1 8/2004 Hardisty et al.
2004/0153506 A1 8/2004 Ito et al.
2004/0154022 A1 8/2004 Boss et al.
2004/0157586 A1 8/2004 Robinson et al.
2004/0162830 A1 8/2004 Shirwadkar et al.
2004/0171396 A1 9/2004 Carey et al.
2004/0176081 A1 9/2004 Bryham et al.
2004/0179039 A1 9/2004 Blattner et al.
2004/0186738 A1 9/2004 Reisman
2004/0186887 A1 9/2004 Galli et al.
2004/0193684 A1 9/2004 Ben-Yoseph
2004/0193722 A1 9/2004 Donovan
2004/0196315 A1 10/2004 Swearingen et al.
2004/0198351 A1 10/2004 Knotts
2004/0199581 A1 10/2004 Kucharewski et al.
2004/0199582 A1 10/2004 Kucharewski
2004/0201624 A1 10/2004 Crawford
2004/0203766 A1 10/2004 Jenniges et al.
2004/0204068 A1 10/2004 Komaki
2004/0204140 A1 10/2004 Nagata
2004/0205126 A1 10/2004 Ben-Yoseph
2004/0205127 A1 10/2004 Ben-Yoseph
2004/0210639 A1 10/2004 Ben-Yoseph et al.
2004/0210844 A1 10/2004 Pettinati et al.
2004/0215648 A1 10/2004 Marshall
2004/0215721 A1 10/2004 Szeto
2004/0215793 A1 10/2004 Ryan et al.
2004/0219936 A1 11/2004 Kontiainen
2004/0220897 A1 11/2004 Bernhart et al.
2004/0221309 A1 11/2004 Zaner
2004/0231003 A1 11/2004 Cooper et al.
2004/0243844 A1 12/2004 Adkins
2004/0255122 A1 12/2004 Ingerman et al.
2004/0267604 A1 12/2004 Gross et al.
2005/0004978 A1 1/2005 Reed et al.
2005/0004984 A1 1/2005 Simpson
2005/0004995 A1 1/2005 Stochosky
2005/0009541 A1 1/2005 Ye et al.
2005/0015432 A1 1/2005 Cohen
2005/0021750 A1 1/2005 Abrams
2005/0021854 A1 1/2005 Bjorkner
2005/0027382 A1 2/2005 Kirmse
2005/0038856 A1 2/2005 Krishnasamy
2005/0050143 A1 3/2005 Guster
2005/0055306 A1 3/2005 Miller et al.
2005/0055340 A1 3/2005 Dresden
2005/0055416 A1 3/2005 Heikes
2005/0066362 A1 3/2005 Rambo
2005/0071251 A1 3/2005 Linden et al.
2005/0076240 A1 4/2005 Appleman
2005/0076241 A1 4/2005 Appelman
2005/0086305 A1 4/2005 Koch et al.
2005/0091314 A1 4/2005 Blagsvedt et al.
2005/0096084 A1 5/2005 Pohja et al.
2005/0102202 A1 5/2005 Linden et al.
2005/0108329 A1 5/2005 Weaver et al.
2005/0108341 A1 5/2005 Matthew et al.
2005/0114229 A1 5/2005 Ackley
2005/0114783 A1 5/2005 Szeto
2005/0125559 A1 6/2005 Mutha
2005/0149606 A1 7/2005 Lyle et al.
2005/0160144 A1 7/2005 Bhatia
2005/0171955 A1 8/2005 Hull et al.
2005/0172001 A1 8/2005 Zaner et al.
2005/0177486 A1 8/2005 Yeager
2005/0181878 A1 8/2005 Danieli et al.
2005/0188044 A1 8/2005 Fleming, III
2005/0195802 A1 9/2005 Klein et al.
2005/0197846 A1 9/2005 Pezaris
2005/0198131 A1 9/2005 Appelman
2005/0198172 A1 9/2005 Appelman
2005/0198173 A1 9/2005 Evans
2005/0198268 A1 9/2005 Chandra
2005/0204063 A1 9/2005 O'Brian
2005/0208957 A1 9/2005 Knotts
2005/0216300 A1 9/2005 Appelman et al.
2005/0223075 A1 10/2005 Swearingen et al.
2005/0239550 A1 10/2005 Hardisty et al.
2005/0246420 A1 11/2005 Little, II
2005/0251515 A1 11/2005 Reed et al.
2005/0289469 A1 12/2005 Chandler et al.
2006/0009243 A1 1/2006 Dahan et al.
2006/0026237 A1 2/2006 Wang et al.
2006/0031080 A1 2/2006 Mallya et al.
2006/0031772 A1 2/2006 Valeski
2006/0036701 A1 2/2006 Bulfer et al.
2006/0047187 A1 3/2006 Goyal et al.
2006/0047747 A1 3/2006 Erickson et al.
2006/0116139 A1 6/2006 Appelman
2006/0117380 A1 6/2006 Tachizawa et al.
2006/0129678 A1 6/2006 Morita
2006/0136584 A1 6/2006 Decker et al.
2006/0149644 A1 7/2006 Sulmar et al.
2006/0154650 A1 7/2006 Sherman et al.
2006/0168204 A1 7/2006 Appelman et al.
2006/0242583 A1 10/2006 MacNaughton et al.
2006/0259344 A1 11/2006 Patel et al.
2006/0259476 A1 11/2006 Kadayam et al.
2006/0271687 A1 11/2006 Alston et al.
2006/0288077 A1 12/2006 Chen
2007/0092072 A1 4/2007 Jacobs
2007/0112966 A1 5/2007 Eftis et al.
2007/0250566 A1 10/2007 Appelman
2008/0133417 A1 6/2008 Robinson
2008/0255989 A1 10/2008 Altberg et al.
2009/0016499 A1 1/2009 Hullfish et al.
2009/0043844 A1 2/2009 Zimmer et al.
2009/0070306 A1 3/2009 Stroe
2009/0070433 A1 3/2009 Karstens

(56) References Cited

U.S. PATENT DOCUMENTS

| | | | |
|---|---|---|---|
| 2011/0167116 | A1 | 7/2011 | Kucharewski et al. |
| 2011/0282955 | A1 | 11/2011 | Appelman |
| 2012/0198012 | A1 | 8/2012 | Odell et al. |
| 2012/0233269 | A1 | 9/2012 | Ben-Yoseph |

FOREIGN PATENT DOCUMENTS

| | | |
|---|---|---|
| EP | 0889660 | 1/1999 |
| EP | 1054329 | 11/2000 |
| EP | 1071295 | 1/2001 |
| EP | 1091532 | 4/2001 |
| EP | 1102443 | 5/2001 |
| EP | 1104961 | 6/2001 |
| EP | 1104965 | 6/2001 |
| EP | 1113619 | 7/2001 |
| EP | 1113620 | 7/2001 |
| EP | 1113631 | 7/2001 |
| EP | 1113640 | 7/2001 |
| EP | 1113659 | 7/2001 |
| EP | 1113677 | 7/2001 |
| EP | 1011243 | 10/2001 |
| EP | 1207655 | 5/2002 |
| EP | 1213874 | 6/2002 |
| EP | 1237384 | 9/2002 |
| EP | 1248484 | 10/2002 |
| EP | 1248486 | 10/2002 |
| EP | 1255414 | 11/2002 |
| EP | 1274222 | 1/2003 |
| EP | 1104964 | 6/2012 |
| GB | 2328835 | 3/1999 |
| GB | 2357932 | 7/2001 |
| GB | 2368747 | 5/2002 |
| JP | 04-86950 | 3/1992 |
| JP | 08-123821 | 5/1996 |
| JP | 09-247334 | 9/1997 |
| JP | 11-161682 | 6/1999 |
| JP | 11-328194 | 11/1999 |
| JP | 2000-148795 | 5/2000 |
| JP | 2000-222424 | 8/2000 |
| JP | 2001-109752 | 4/2001 |
| JP | 2002-007479 | 1/2002 |
| JP | 2002-132832 | 5/2002 |
| JP | 2002-175301 | 6/2002 |
| KR | 10-2001-012984 | 3/2001 |
| KR | 10-2001-048800 | 6/2001 |
| WO | 97/34244 | 9/1997 |
| WO | 97/37303 | 10/1997 |
| WO | 98/20410 | 6/1998 |
| WO | 98/47270 | 10/1998 |
| WO | 99/34628 | 7/1999 |
| WO | 00/10099 | 2/2000 |
| WO | 00/42791 | 7/2000 |
| WO | 00/43892 | 7/2000 |
| WO | 00/47270 | 7/2000 |
| WO | 00/79396 | 12/2000 |
| WO | 01/40957 | 6/2001 |
| WO | 01/41477 | 6/2001 |
| WO | 01/63423 | 8/2001 |
| WO | 01/67622 | 9/2001 |
| WO | 01/67787 | 9/2001 |
| WO | 01/69406 | 9/2001 |
| WO | 01/80079 | 10/2001 |
| WO | 02/03216 | 1/2002 |
| WO | 02/19643 | 3/2002 |
| WO | 02/77840 | 3/2002 |
| WO | 02/28046 | 4/2002 |
| WO | 02/073886 | 9/2002 |
| WO | 02/093400 | 11/2002 |
| WO | 02/093875 | 11/2002 |
| WO | 2003/021929 | 2/2003 |
| WO | 01/06748 | 1/2004 |
| WO | 2004/111812 | 12/2004 |
| WO | 2004/111871 | 12/2004 |
| WO | 2005/086723 | 9/2005 |
| WO | 2005/089286 | 9/2005 |
| WO | 2006/026908 | 3/2006 |
| WO | 2006/068955 | 6/2006 |

OTHER PUBLICATIONS

Parent Tools—The Ultimate in Monitoring and Controlling AIMe, "Parent Tools for AIM," http://www.parent-tools.com/screenshots.htm, pp. 1-4, as accessed on Dec. 10, 2003.

McMurray, Susan, "Shield your children from unsuitable Internet content," http://www.microsoft.com/canada/home/internet&security/2.4.8_ protectwithparentalcontrolshowtosafeguardyourcomputer.asp#, Microsoft Home Magazine, pp. 1-3, as accessed on Dec. 10, 2003.

"Instant Messaging is Everyone's Business," Yahoo Business Messenger, Yahoo! 2003.

"SurfControl Instant Message Filter," Instant Message Filter, SurfControl plc. 2003.

"Spammers Target Instant Message Users," http://www.bizreport.com/article.php?art_id=5507 Nov. 13, 2003, pp. 1-4.

Olsen, Stefanie, "Will instant messaging become instant spamming?," http://news.com.com/2100-1023-252765.html?legacy=cnet, Feb. 16, 2001, pp. 1-4.

"Protect Your Privacy," MSN Features, http://messenger.msn.com/Feature/Privacy.aspx, as accessed on Dec. 2, 2003.

"Jabber" http://www.labber.com/index.cgi?CONTENT_ID=9, as accessed on Dec. 4, 2003.

"Knock Settings—Servers Tab," http://www.knockmail.com/support/advserverset.html, pp. 1-2, as accessed on Dec. 4, 2003.

"Preview Pending Emails in KnockMail," http://www.knockmail.com/support/previewemail.html, pp. 1-2, as accessed on Dec. 4, 2003.

"Managing your Addresses in KnockMail," http://www.knockmail.com/support/manaddresses.html, pp. 1-2, as accessed on Dec. 4, 2003.

"Approved Database," http://www.knockmail.com/support/appdatabase.html, pp. 1, as accessed on Dec. 4, 2003.

"Pending Database for KnockKnock," http://www.knockmail.com/support/penddatabase.html, pp. 1, , as accessed on Dec. 4, 2003.

"Denied Database for KnockKnock," http://www.knockmail.com/support/denydatabase.html, pp. 1, , as accessed on Dec. 4, 2003.

"Email Server Control for KnockKnock," http://www.kncekmail.com/support/emailservcont.html, as accessed on Dec. 4, 2003.

"Listserv Control for KnockKnock," http://www.knockmail.com/support/listservcont.html, pp. 1, , as accessed on Dec. 4, 2003.

"Email Server Control for KnockKnock," http://www.knockmail.com/support/emailservcont.html, pp. 1-2, as accessed on Dec. 4, 2003.

http://www.knockmail.com/support/newsettings.jpg, , as accessed on Dec. 4, 2003.

ICQ 99a, "Welcome to ICQ version 99a", XP-002163918, ICQ Inc., 1998.

R. Hall, "A Countermeasure to Duplicate-detecting Anti-spam Techniques", AT&T Labs Technical Report 99.9.1, 1999.

A. Kolcz and J. Alspector, "SVM-based Filtering of E-mail Spam with Content-specific Misclassification Costs," *TextDM'2001* (*IEEE ICDM-2001 Workshop on Text Mining*), San Jose, CA, 2001.

M. Marvin, "Announce: Implementation of E-mail Spam Proposal", news.admin.net-abuse.misc, Aug. 3, 1996.

S. Hird, "Technical Solutions for Controlling Spam in the proceedings of AUUG2002", Melbourne, Sep. 4-6, 2002.

M. Hearst et al., "Support Vector Machines", IEEE Intelligent Systems, Jul./Aug. 1998.

H. Drucker et al., "Support Vector Machines for Spam Categorization", IEEE Transactions on Neural Networks, vol. 10, No. 5, Sep. 1999.

T. Joachims, Text Categorization with Support Vector Machines: Learning with Many Relevant Features, University of Dortmund, Computer Science Dept., LS-8 Report 23, 1998.

J. Dudley, "Telstra targets Net spammers", news.com.au, Dec. 2, 2003.

(56) References Cited

OTHER PUBLICATIONS

Bart Massey et al.; "Learning Spam: Simple Techniques for Freely-Available Software", Computer Science Dept., Portland, OR USA, 2003, pp. 1-14.
Leander Kahney, "Will You Buy a Car From This Man?", Oct. 6, 2003, pp. 1-3.
Joanna Glasner, "Social Nets Find Friends in VCs", http://www.wired.com/news , Nov. 17, 2003, pp. 1-3.
Ion Adroutsopoulos of al., "Learning to Filter Spam E-Mail: A Comparison of a Naïve Bayesian and a Memory-Based Approach", University of Athens, pp. 1-12.
Paul Graham, "Better Bayesian Filtering", Jan. 2003, pp. 1-11, http://www.paulgraham.com/better.html.
Paul Mutton, "PieSpy Social Network Bot—Inferring and Visualizing Social Networks on IRC", jibble.org, http://listerlinux-srv.anlx.net/piespy, © 2001-2004, pp. 1-18.
"A Reputation System for Peer-to-Peer Networks," Gupta et al., Jun. 1-3, 2003, NOSSDAV'03, Monterey, California, pp. 144-152.
"BestCalls.com Announces the BestCalls Technology Index," Business Wire, Jun. 30, 1999, Business Wire, (2 pages).
"Business at Cyberspeed; Brainstorm Becomes Quick Internet Hit," Walker, Jan. 24, 1999, The Washington Post, p. A.01 (4 total pages).
"CrushParty.com: Help," retrieved Jun. 12, 2002 from the World Wide Web: http://www.crushparty.com/help.jsp, 3 pages.
"Digital Artifacts for Remembering and Storytelling: Post History and Social Network Fragments," Viegas et al., retrieved from the World Wide Web: http://we.media.mit.edu/~fviegas/papers/posthistory_snf.pdf, 10 total pages.
"Finding Others Online: Reputation Systems for Social Online Spaces," Jensen et al., Apr. 20-25, 2002, CHI, Minneapolis, Minnesota, vol. 4, Issue 1, pp. 447-454.
"Hottie or Nottie? Web Site Voters Let You Know 'Whether You Sizzle or Fizzle," Marino, Jul. 11, 2001, Florida Times Union, p. C. I. (2 total pages).
"Icq.anywhere, Email Features—Email Center—ICQ.com," retrieved Apr. 29, 2004 from the World Wide Web: http://www.icq.com/email/popular-features.html, pp. 1-5.
"Idea for Online Networking Brings Two Entrepreneurs Together," Patents; Idea for Online Networking Brings Two Entrepreneurs Together, reprinted from http://www.nytimes.com/2003/12/01/technology/0lpatt.html?adxnn1+0&adxnnlx=107029 . . . , printed on Nov. 5, 2004 (2 pages).
"Instant Messaging for Gamers," PC Gamer, May 2004, vol. 11, No. 5, (2 pages).
"Lotus Instant Messaging Everyplace FAQ," retrieved Apr. 29, 2004 from the World Wide Web: http://www.lotus.com/products/product4.nsf/wdocs/249c6f083166cd3e85256d7300714407, pp. 1-3.
"PieSpy—Inferring and Visualizing Social Network on IRC," PieSpy Social Network Bot, reprinted from http://lister.linux-srv.anlx.net/piespy printed on Mar. 11, 2004 (18 pages).
"plaxo," Plaxo, reprinted from http://web.archive.org/web/20041105072256/http://www.plaxo.com/ printed on Nov. 5, 2004 (available on Feb. 14, 2004) (2 pages).
"Plaxo—Update Your Address Book," Plaxo Contact Networks, reprinted from http://web.archive.org/web/20030218233638/http://www.plaxo.com/ printed on Nov. 5, 2004 (available on Feb. 18, 2003) (1 page).
"Reputation Systems," Resnick et al., Dec. 2000, Communications of the ACM, vol. 43, No. 12, pp. 45-48.
"RIM Road: Software: Internet & Network: Webmessenger RIM J2ME/Instant Messaging," retrieved Apr. 29, 2004 from the World Wide Web; http://www.rimrod.com/software/rim1/Webmessenger-RIM-J2ME-Instant-Messaging-20 . . . , pp. 1-4.
"Social Nets Find Friends in VCs", Joanna Glasner, Wired News, Nov. 17, 2003, http://www.wired.com/news/culture/0,1284,61227,00.html (4 pages).
"Social Sites Clicking With Investors," Washingtonpost.com: Social Sites Clicking With Investors, reprinted from http://www.washingtonpost.com/ac2/wp-dyn/A32066-2003Nov12?language-printer printed on Nov. 5, 2004, (2 pages).
"Social Social Networks: Deodorant for the Soul?," Esther Dyson, Esther Dyson's Monthly Report, vol. 21, No. 11, Dec. 12, 2003, www.edventure.com, (36 pages).
"Socialware: Multiagent Systems for Supporting Network Communities," Hattori et al., Mar. 1999, Association for Computing Machinery, Communications of the ACM, vol. 42, Issue 3, (6 pages).
"Spoke Builds on Social Networking Patent Portfolio," Spoke Builds on Social Networking Patent Portfolio, reprinted from http://www.internetnews.com/ent-news/print.php/3073621 printed on Nov. 5, 2004 (3 pages).
"SWF Seeks Attractive Head Shot; to Stand Out, Online Daters Pay for Professional Photos; Cropping out the Ex-Wife," Leiber, Nov. 19, 2003, The Wall Street Journal, p. D.1.
"Technology Journal—Are You Satisfied? EBay's Battle Against Fraud Rests Primarily on a Simple Concept: Customer Feedback," Wingfield, Sep. 23, 2002, Asian Wall Street Journal, p. T.8, (4 total pages).
"Technology Journal: Changing Chat—Instant Messaging is Taking Off, and for Some Users It's Nuzzling Out the Phone," Nick Wingfield, Asian WSJ, Sep. 2000, (5 pages).
"The first Social Software . . . a true Social Adventure," Huminity-Social Networking, Chat Software, CreatePersonal Free Blogs and My Group . . . , reprinted from http://www.huminity.com/ printed on Nov. 5, 2004 (2 pages).
"Trillian Discussion Forums—HOWTO: Import ICQ 2003a Contact List," retrieved Apr. 29, 2004 from the World Wide Web: http://trillian.cc/forums/showthread.php?s+&threadid=36475, pp. 1-2.
"Welcome to Huminity World of Connections," Huminity-Home, reprinted from http://web.archive.org/web/20030228131435/www.huminity.com/default.php?internationa . . . printed on Nov. 5, 2004 (available on Feb. 2, 2003) (1 page).
America Online Inc., "AOL Instant Messenger", Aug. 29, 2000, Internet: www.aol.com/aim/, (18 pages).
America Online Inc., New AIM 4.7, Sep. 27, 2001, Internet: http://aim.aol.com, (7 pages).
CNET Networks Inc., "PopUp Killer", Sep. 13, 2001, Internet: download.cnet.com/downloads/0-10059-100-6932612.html, (3 pages).
International Search Report and Written Opinion dated Feb. 15, 2006 for International Application No. PCT/US05/07204, (10 pages).
International Search Report and Written Opinion issued in International Application No. PCT/US05/45663, dated Apr. 11, 2008.
International Search Report issued in Application Serial No. PCT/US05/08476, dated Oct. 16, 2006, (8 pages).
International Search Report issued in International Application No. EP03731244, dated Aug. 30, 2005, (4 pages).
Office Action issued in U.S. Appl. No. 10/146,814, dated Jul. 2, 2007, 15 pages.
Office Action issued in U.S. Appl. No. 10/146,814, dated Dec. 11, 2006, 15 pages.
Office Action issued in U.S. Appl. No. 10/184,002, dated Jan. 9, 2007, 11 pages.
Office Action issued in U.S. Appl. No. 10/334,056, dated Oct. 30, 2008 (19 pages).
Office Action issued in U.S. Appl. No. 10/334,056, dated May 12, 2008 (22 pages).
Office Action issued in U.S. Appl. No. 10/334,056, dated Nov. 5, 2007 (21 pages).
Office Action issued in U.S. Appl. No. 10/334,056, dated May 21, 2007, (7 pages).
Office Action issued in U.S. Appl. No. 10/334,056, dated May 10, 2006, (7 pages).
Office Action issued in U.S. Appl. No. 10/334,056, dated Oct. 31, 2005, 7 pages.
Office Action issued in U.S. Appl. No. 10/334,056, dated Jul. 6, 2005, 24 pages.
Office Action issued in U.S. Appl. No. 10/334,056, dated Nov. 29, 2004, 22 pages.
Office Action issued in U.S. Appl. No. 10/633,636, dated Oct. 11, 2006, 9 pages.
Office Action issued on U.S. Appl. No. 10/746,230 on Mar. 17, 2009, 13 pages.

(56) References Cited

OTHER PUBLICATIONS

Office Action issued in U.S. Appl. No. 10/746,232, dated Mar. 18, 2009, 26 pages.
Office Action issued in U.S. Appl. No. 10/981,460, dated Aug. 20, 2008, 24 pages.
Office Action issued in U.S. Appl. No. 11/015,423, dated Mar. 2, 2009, 33 pages.
Office Action issued in U.S. Appl. No. 11/015,424, dated Mar. 19, 2008, 43 pages.
Office Action issued in U.S. Appl. No. 11/015,424, dated May 1, 2009, 47 pages.
Office Action issued in U.S. Appl. No. 11/015,476, dated Mar. 2, 2009, 29 pages.
Office Action issued in U.S. Appl. No. 11/017,204, dated Jun. 23, 2008, 33 pages.
Office Action issued in U.S. Appl. No. 11/017,204, dated Dec. 12, 2007, 13 pages.
Office Action issued in U.S. Appl. No. 11/079,522, dated Apr. 3, 2009, 14, pages.
Office Action issued in U.S. Appl. No. 11/079,522, dated Oct. 16, 2008, 33 pages.
Office Action issued in U.S. Appl. No. 11/237,718, dated Apr. 2, 2009, 53 pages.
Office Action issued in U.S. Appl. No. 11/464,816, dated Apr. 21, 2009, 29 pages.
Supplementary European Search Report issued in European Application No. EP05728303, dated Jan. 9, 2009, (4 pages).
Supplementary European Search Report issued in European Application No. 05857099.5-1238/1836596 PCT/US2005045663, dated Nov. 7, 2008, (5 pages).
Ed Bott and Ron Person, Using Windows 95 with Internet Explorer 4.0, Feb. 17, 1998, Que, Special Edition, 21 pages.
Home-tribe.net, http://washingtondc.tribe.net/message/24434dlb-817b-4580-aa42-3bffa15f26a?page=1 (4 total pages).
http://www.friendster.com (17 pages).
McKendrick, Joseph; "Internet Call Centers: New Era in Customer Service"; Feb. 2002; V10, n2, pp. 22(4).
Neo Mai, Ken Neo. "Buying and selling on the internet; [Computimes, 2* Edition]." New Straits Times. Kuala Lumpur: Jun. 28, 2001. p. 53.
R. Movva & W. Lai, "MSN Messenger Service 1.0 Protocol", Aug. 1999, Internet Draft, http://tools.ietf.org/id/draft-movva-msn-messenger-protocol-oo.txt, 28 pages.
Reichard, K., "AOL, ICQ to Interoperate—But in a Limited Fashion," Oct. 30, 2002, InstantMessagingPlanet, available at www.instantmessagingplanet.com/public/article.php/1490771.
Ryze home page, www.ryze.com, Dec. 21, 2003, available at http://web.archive.org/web/20031221010006/http://ryze.com, printed Mar. 16, 2005, 13 pages.
VisiblePath webpages, www.visiblepath.org, Dec. 3, 2003, available at http://web.archive.org/web/20031203132211/http://www.visiblepath.com, printed Mar. 16, 2005, 5 pages.
WebmasterWorld.com Inc., "HTML and Browsers", Mar. 5, 2001, Internet: www.webmaster.com/forum21/367.htm, 2 pages.
ZeroDegrees home page, www-zerodegrees.com, Jan. 24, 2004, available at http://web.archive.org/web/20040204153037/www.zerodegrees.com/home.htm, printed Mar. 16, 2005, 2 pages.
U.S. Appl. No. 10/715,213, filed Nov. 18, 2003, Schlegel.
U.S. Appl. No. 11/023,652, filed Dec. 29, 2004, Odell.
U.S. Appl. No. 13/361,141, filed Jan. 30, 2012, Appleman et al.
U.S. Appl. No. 13/617,350, filed Sep. 14, 2012, Appleman.
U.S. Appl. No. 13/617,330, filed Sep. 14, 2012, Appleman.
U.S. Appl. No. 13/617,270, filed Sep. 14, 2012, Appleman.
U.S. Appl. No. 13/619,009, filed Sep. 14, 2012, Heikes.
U.S. Appl. No. 13/619,036, filed Sep. 14, 2012, Heikes.
U.S. Appl. No. 13/619,054, filed Sep. 14, 2012, Heikes.
U.S. Appl. No. 13/620,862, filed Sep. 15, 2012, Appleman et al.
U.S. Appl. No. 13/620,863, filed Sep. 15, 2012, Appleman et al.
U.S. Appl. No. 13/620,865, filed Sep. 15, 2012, Appleman et al.
"AOL's Grand Goal; America Online seeks to transform itself into a major Internet player," Information Week, Jul. 31, 1995 lines 7-23, pp. 38-42.
"Degrees of Separation Email Spam Protection", http://www.halfbakery.com, pp. 1-3.
"Google Zeitgeist-Search Patterns, trends, and surprises according to Google," Jan. 2003, pp. 1-2, http://www.google.corn/press/zeitgeist.html (visited Feb. 13, 2003).
"Index of /tarvizo/OldFiles/elips/tnt-2.4", Jul. 2, 2001, TNT, http://web.mit.edu/tarvizo/OldFiles/elips/tnt-2.4/.*.
"Prodigy Launches 100 Interest Groups on the World Wide Web; All Sites Have Deep Links to Chat and Newsgroups; Topics Range from "Adventure Travel" and "Astrology" to "Virtual Reality" and "Wrestling"", Business Wire, Sep. 27, 1995, 4 Pages.
A. Dornan, "Instant Gratification [instant messaging]", Network Magazine, Aug. 2000, INSPEC p. 9.
A.C.M. Fong et al., "Towards an Open Protocol for Secure Online Presence Notification", Computer Standards & Interfaces, Sep. 2001, INSPEC p. 2.
A.E. Milewski et al., "Providing Presence Cues to Telephone Users", Proceedings of CSCW 2000, ACM Conference on Computer Supported Cooperative Work, 2000, INSPEC p. 3.
America Online Growing Pains, Newsbytes, Mar. 7, 1995.
U.S. Appl. No. 10/974,969, filed Oct. 28, 2004, 56 pages.
U.S. Appl. No. 11/574,831, filed Mar. 7, 2007, International Application No. PCT/US2004/029291, 44 pages.
Application No. PCT/US05/45630, Dated Oct. 23, 2006.
Armstrong, R., et al., "Web Watcher: a learning apprentice for the world wide web," Feb. 1, 1995, 7 pages.
ATMobile Develops Networking-Sensing Instant Messaging, Dec. 9, 1999, Newsbyte, pp. 1-2.
Automated feature of Internet Explorer, www.geocities.com/technofundo/tech/web/ie_autocomplete.html, pp. 1-6.
B. Raman et al., "Universal Inbox-Providing Extensible Personal Mobility and Service Mobility in an Integrated Communication Network", Proceedings Third IEEE Workshop on Mobile Computing Systems and Applications, 2000, INSPEC p. 7.
Brown et al., "WWW Plug-Ins Companion," Que Corporation, Oct. 1996, pp. 351-362.
Brugali, Davide. "Mediating the Internet." Annals of Software Engineering. vol. 13, pp. 285-308. 2002. Kluwer Academic Publishers, The Netherlands.
Bryan Pfaffenberger, Netscape Navigator Gold, AP Professional, 1997.
Business Information Corporation, Sep. 1, 1999, Atmobile.com Enters 'IM' World.
Business Wire Atmobile Corporation, Sep. 13, 1999.
Cerulean Studios, "Trillian Pro: No Boundaries," (Overview, New Features, Tech Specs, Coporate, Product Tour-16 total pages).
Cerulean Studios, "Trillian: Your Freedom to Chat," (Overview, New Features, Screenshots, Tech Specs-8 total pages)).
Chen, Hao et al. "Bringing Order to the Web: Automatically Categorizing Search Results." Proceedings of the SIGCHI conference on human factors in computing systems. ACM Press. pp. 145-152. New York, 2000.
Chung-Hwa Herman Rao et al.; iMobile: A Proxy-Based Platform for Mobile Services; Netowrk Services Research Center AT&T Labs-Rsearch, 2001.
Chung-Hwa- Rao, H. Di-Fa Chang, Yi-Bing Lin, "iSMS: an integration platform for short meassage service and IP networks," Network, IEEE, vol. 15, No. 2, pp. 48-55, Mar./Apr. 2001.
ConNexus to awarenex: extending awareness to mobile users, Tang, J.C. and Yankelovich, N. And Begole, J. and Van Kleek M. and Li, F. and Bhalodia J., Proceedings of the SIGCHI conference on Human factors in computing systems, pp. 221-228, 2001, ACM Press, New York, NY, USA.
Danny Sullivan, "What People Search For," Search Engine Watch, pp. 1-4, http://searchenginewatch.com/facts/searches.html (visited Feb. 13, 2003).
European Office Action, Application Serieal No. 03 811 635.5-2201, dated Oct. 4, 2006, 4 Pages.
European Office Communication issued in Application No. EP 97946924.4-1238 mailed Apr. 5, 2007, 7 pages.

(56) References Cited

OTHER PUBLICATIONS

European Oral Proceedings issued in Application No. EP 97946924.4-1238 mailed Feb. 6, 2007, 9 pages.
European Oral Proceedings issued in Application No. EP 97946924.4-1238 mailed Oct. 7, 2007, 8 pages.
G. Held, "Instant Messaging Finds its Voice", Network Magazine, May 2001, INSPEC p. 5.
G. Reif et al.; A Web-based Peer-to-Peer Architecture for Collaborative Nomadic Working; Technical Univesrity of Vienna, Distributed Systems Group, Jun. 20, 2000.
Gross et al., "Computer-Supported Cooperative Work and the Internet," IEEE, Sep 1996, 00. 425-430.
H. Schulzrinne et al., "The IETF Internet Telephony Architecture and Protocols", IEEE Network, May-Jun. 1999, INSPEC p. 11.
Haim Schneider, Lotus Developer Domain, "Adding a popup menu to your Sametime links", pp. 1-8, Jul. 1, 2003.
Hubbub: a sound enhanced mobile instant messenger that supports awareness and opportunistic interactions, Issacs, E. and Walendowski A.m and Ranganathan, D., Proceedings of the SIGCHI conference on Human Factors in computing systems: Changing our world, changing ourselves, pp. 179-186, 2002, ACM Press New York, NY, USA.
IBM Lotus Software, Sametime Everyplace FAQ Overview Inofrmation, pp. 1-3, http://www.lotus.com/products/wireless.nsf/allpublic . . , (visted Jul. 28, 2003).
IBM Lotus Software, Sametime Everyplace Wireless Collaboration that's Fit for e-Business, pp. 1-2, http://www.lotus.com/products.wireless.nsf/allpublic . . , (visited Jul. 28, 2003).
IM Means Business IEEE Spectrum, Nov. 2002.
imForwards.com-FAQ's; Oct. 21, 2003.
Instant messaging in teen life, Grinter, R.E. and Palen, L., Proceedings of the 2002 ACM conference on Computer supported cooperative work, pp. 21-30, 2002, ACM Press, New York, NY, USA.
Instant Messaging with Mobile Phones to Support Awareness, Mitsuoka, M. and Watanabe, S. and Kakuta, J. and Okuyama, S., pp. 223-230, 2001, IEEE.
International Application No. PCT/US2004/029291, filed Sep. 8, 2004, 47 pages.
International Search Report and Written Opinion for International Application No. PCT/US05/45630, Dated Oct. 23 2006.
International Search Report dated Jan. 27, 2005 for International Application No. PCT US2004/009422, International Filing Date Mar. 26, 2004.
International Search Report issued in International Application No. PCT/US03/36795 mailed Jun. 23, 2004, 9 pages.
International Search Report mailed Dec. 27, 2005 for International Application No. PCT/US2004/29291, filed Sep. 8, 2004.
International Search Report, Application Serical No. PCT/USO4/23382, dated Feb. 1, 2007, 12 pages.
International Search Report, PCT/US03/36656, dated Apr. 22, 2004.
International Standard, Information technology-telecommunications and information exchange between systems-private integrated services network-specifications, functional model and information flows-Short message service, ISO/IEC21989, Jul. 1, 2002.
J. Felix Hampe et al., Mobile Electronic Commerce: Reintermediation in the Payment System, Electronic Commerce: The End of the Beginning 13 th International Bled Electronic Commerce Conference Bled, Slovenia, Jun. 19-21, 2000.
Jabber, Inc., Jabber Wireless Gateway Overview, 2001.
Jennifer 8. Lee, "From 100 countries, a Google snapshot of what's going on," International Herald Tribune, Nov. 29, 2002, pp. 1-3, http://www.iht.com.
Joanna Glasner, "Social Nets Find Friends in VCs", Nov. 17, 2003, pp. 1-3, available at http://www.wired.com/culture/lifestyle/news/2003/11/61227?currentPage=all.
Jonathan B Postel, "Simple Mail Transfer Protocol", RFC788, Information Science Institute, Nov. 1981.
Julian Byrne, "My Spamblock was thrwarting UCE address culling programs", news.admin.net-abuse.e-mail, Jan. 19, 1997.
Kirk Scott, Ubique's Virtual Places: Communication and interaction on the World Wide Web, 1 page, http://www.w3.org/collabroation/workshop/proceedings/p2.html, (visted Jul. 28, 2003).
Komatsu et al., "Text Input with Dynamic Abbreviation Expansion." *IPSJ SIG Notes*, vol. 2001, No. 87, Sep. 14, 2008, pp. 133-138 in Japanese with a partial English translation.
LaLiberte et al., "A Protocol for Scalable Group and Public Annotations," Elsevier, Apr. 1995, pp. 011-918.
Leander Kahney, "Will You Buy a Car From This Man?", Oct. 6, 2003, pp. 1-3, available at http://www.wired.com/techbiz/media/news/2003/10/60703.
Lieberman, H., "Letizia: An Agent that Assists Web Browsing", Aug. 20, 1995, pp. 924-929.
Luis Felipe Cabrera et al., "Herald: Achieving a Global Event NotificationService", Microsoft Research.
M. Castelluccio, "e-mail in Real Time", Strategic Finance, Sep. 1999, INSPEC p. 10.
M. Day, S Aggarwal, G Mohr, J. Vincent, RFC 2279 Instant Messaging/Presence Protocol Requirements, Feb. 2000.
M. Meola et al., "Real-Time Reference Service for the Remote User: From the Telephone and Electronic Mail to Internet Chat, Instant Messaging and Collaborative Software", Reference Librarian, 1999 INSPEC p. 8.
M. Smith et al.; Conversation Trees and Threaded Chats; Collaboration & Multimedia Group, Microsoft Research, Redmond, WA, 2000.
Mark Handel et al., "TeamPortal: Providing Team Awareness on the Web".
Mobile instant messaging through Hubbub, Issacs, E. and Walendowski, A. and Ranganathan, D., Communications of the ACM, vol. 45, No. 9, pp. 68-72, 2002, ACM Press New York, NY USA.
Morikawa, et al., "Part 2 Build up a Comfortable Search Enviroment via Customization by Rules," *PC Japan*, vol. 7, No. 10, pp. 172-176, in Japanese wth a partial English translation of p. 172.
Mozilla, www.mozilla.org/projects/ml/autocomplete, Mar. 13, 2003.
N. Liew Kwek Sing; *AOL ICQ* vs. *MSN Messenger*; Department of Electronic and Computer Science , University of Southampton, 2003.
Nardi, B.A., Whittaker, S. and Bradner, E. 2000. Interaction and outreaction: instant messaging in Action. In Proceedings of the 2000 ACM Conference on Computer Supported Cooperative Work (Philadelphia, Pennslyvannia, USA.) CSCW '00. ACM New York, NY, 79-88.
"Wireless Instant Messaging Solution . . . " Newswire, NY Dec. 8, 1999 Atmobile corp, pp. 1-2.
Nextel Announces On-Line Paging Service Provided by Wireless Services—First Wireless Telephone Messaging Service to Offer Delivery Confirmation, Aug. 12, 1998, NY.
Notification of Transmittal of the International Search Report or the Declaration dated Jun. 23, 2004 for International Application Serial No. PCT/US03/36795.
Office Action for U.S. Appl. No. 10/715,216 Mailed Aug. 18, 2009.
Office Action issued in Chinese Application No. 200480013443.9, mailed Mar. 6, 2009, 20 pages, including English translation.
Office Action mailed Apr. 26, 2007 issued in U.S. Appl. No. 10/715,213, 15 pages.
Office Action mailed Apr. 21, 2005 for European Application No. 97946924.4-1238, 6 pages.
Office Action mailed Aug. 7, 2008 issued in U.S. Appl. No. 10/715,213.
Office Action mailed Feb. 5, 2009 issued in U.S. Appl. No. 10/715,213.
Office Action mailed May 21, 2008 for European Application No. 97946924.4-1238, 10 pages.
Office Action mailed Sep. 27, 2007 issued in U.S. Appl. No. 10/715,213, 14 pages.
Office Action, Application U.S. Appl. No. 10/715,216. dated Feb. 12, 2007, 39 pages.
Online! Feb. 1, 2003, pp. 1-2, XP002297111, Webpage of Slipstick Systems: To add addresses automatically to Microsoft Outlook Contacts, http://web.archive.org/web/20030201082058/http://www.slipstick.conn/contacts/addauto.htm> retrieved on Sep. 17, 2004 the whole document.

(56) References Cited

OTHER PUBLICATIONS

Parviainen et al., "Mobile Instant Messaging", Jul. 3, 2003 IEEE.
Patrice Godefroid et al., "Ensuring Privacy in Presence Awareness Systems: An Automated Verification Approach".
Paul Mutton, "PieSpy Social Network Bot-Inferring and Visualizing Social Networks on IRC", jibble.org, http://lister.linux-srv.anlx.net/piespy, © 2001-2004, pp. 1-18.
Per E. Pedersen et al.; Using the Theory of Planned Behavior to Explain Teenager's Adoption of Text Messaging Services; Agder University College, 2002.
Per E. Pedersen; The Adoption of Text Messaging services among Norwegian Teens: Development and Test of an Extended Adoption Model; SNF-Report No. 23/02; Samfunns-Og Naeringslivsforskning As Bergen, Jun. 2002.
R. Droms, "Dynamic Host Configuration Protocol", Network Working Group, Oct. 1993.
Richard S. Hall, "The Event Desktop: Supporting Event-enabled Clients on the Web", Freie University, Berlin.
Roscheisen et al., "Beyond Browsing: Shared Comments, SOAPs, Trails, and On-line Communities," Elsevier, Apr. 1995, pp. 739-749.
S. Okuyana et al., "New Mobile Service Based on Instant Messaging Technology", Fujitsu, 2001, INSPEC p. 1.
S. Ortiz, Jr., "Instant Messaging: No Longer Just Chat", Computer, Mar. 2001, INSPEC p. 6.
Schulzrinne, H.; Rosenberg J., "The Session Initiation Protocol: Internet-centric signaling," Communications Magazine, IEEE, vol. 38, No. 10, pp. 134-141, Oct. 2000.
Sep. 1, 1999 business Information corporation, Sep. 1, 1999 @mobile.com enters 'IM' world, 1 page.
Sep. 13, 1999 Business wire Atmobile corporation, 2 pages.
SproWuest Wireless Instant messaging (Nov. 22, 1999) InfoSpace.com, pp. 1-2.
Supplementary European Search Report dated Jul. 6, 2006 for Application No. EP 03 81 1631, 3 pages.
Tara Hall, Lotus Developer Domain, "Same Place, Sametime with Chris Price", pp. 1-8, http://www-10.1otus.com/Idd/today.nsf/DisplayForm/ . . , (Visited Jul. 28, 2003), Sep. 2002.
Uhara7, "Re. being invisible to all but one person on your list", alt.chat-programs.icq, Feb. 29, 2000.
V, Vittore, "The Next Dial Tone? [instant messaging]", Telephony, Oct. 16, 2000, INSPEC p. 8.
Walther, M., "Supporting Development of Synchronous Collaboration Tools on the Web with GroCo," Feb. 2-9, 1996, pp. 1-6.
Way-bac machine, handspring tero 270, Jun. 1, 2002.
SM Cherry "Talk is Cheap, Text is Cheaper" (IEEE Spectrum May 2003).
Written Opinion dated Jan. 27, 2005 for International Application No. PCT/US2004/009422, International Filing Date Mar. 26, 2004.
Written Opinion mailed Dec. 27, 2005 for International Application No. PCT/US2004/29291, filed Sep. 8, 2004.
www.yahoo.com, Yahoo! Messenger for Text Messaging, 2002.
Yahoo! Buzz Index, Feb. 13, 1 page, http://buzz.yahoo.com/overall/.
Yahoo! Buzz Index, Retrieved from the Internet: http://web.archive.org/web/20021110100436/http://buzz.yahoo.com Nov. 10, 2002, 1 page.
Yahoo! Messenger, "Messenger Help", (4 Total Pages).
Yiva Hard of Segerstad et al.; Awareness of Presence, Instant Messaging and WebWho; Department of Linguistics, Goteborg University; Sweden, 2001.
Zephyr on Athena (AC-34), http://web.mit.edu/olh//Zephyr/Revision.html, 24 pages.
Phillips Business Information corporation-Aug. 23, 1999-Instant messaging has emerged as one of the most popular communication mediums in the world.
Office Action, U.S. Appl. No. 10/715,214, dated Apr. 20, 2007, 41 pages.
Kyungkoo Jun, et al., "Agent-Based Resource Discovery", IEEE(2000), 10 pages.
"Creating a Single List of Contacts—Google Scholar" available at http://scholar.google.com/scholar?h1=en&lr=&q=creating+a+single+list+list+of+contacts&as . . . (Mar. 27, 2007), 10 pages.
Office Action, U.S. Appl. No. 10/715,214, dated Oct. 9, 2007, 24 pages.
European Search Report, European Application No. 03781972.9-2201, dated Feb. 8, 2008, 5 pages.
Office Action of Jan. 11, 2008 from copending U.S. Appl. No. 10/715,216, 55 Pages.
Microservices: CommWorks Find Me-Follow Me Application; Dec. 11, 2002; commworks.com; pp. 1-2.
Microservices: CommWorks Message Alert System; Dec. 11, 2002; commworks.com; pp. 1-3.
Microservices: CommWorks Message Delivery System; Dec. 11, 2002; commworks.com; pp. 1-2.
CommWorks 8250 Personal Communications Management System; Dec. 11, 2002; commworks.com; pp. 1-2.
CommWorks IP Messaging; Dec. 11, 2002; commworks.com; pp. 1-2.
WebleySystems; CommuniKate Unified Communications Features List; Dec. 11, 2002; webley.com; pp. 1-3.
Upoc Quick Tour; Nov. 6, 2002; upoc.com; pp. 1-9.
Upoc General Help; Nov. 6, 2002; upoc.com; pp. 1-2.
Upoc NYSale; Nov. 6, 2002; upoc.com; pp. 1-2.
Upoc Entertainment Picks; Nov. 6, 2002; upoc.com; pp. 1-3.
Upoc Frequently Asked Questions; Nov. 6, 2002; upoc.com; pp. 1-6.
Microsoft PressPass; Nov. 7, 2002; microsoft.com; pp. 1-9.
Adeptra, Features; Nov. 27, 2002; adeptra.com; pp. 1-2.
Solutions Smartdelivery; Nov. 6, 2002; centerpost.com; pp. 1-2.
Net Alerts Overview; Nov. 7, 2002; microsoft.com; pp. 1-3.
Adeptra Services Overview; Nov. 7, 2002; adeptra.com; pp. 1-7.
Ipipi Frequently Asked Questions; Nov. 6, 2002; ipipi.com; pp. 1-2.
Ozmosys Enterprise; Nov. 7, 2002; ozmosys.com; pp. 1-3.
Teraitech; Nov. 7, 2002; teraitech.com; 1 page.
Global Solutions Directory; Nov. 7, 2002; softwaresibnn.com; pp. 1-5.
"A Countermeasure to Duplicate-detecting Anti-spam Techniques," Robert J. Hall, AT&T Labs Technical Report 99.9.1, 1999, Abst. (27 pages).
America Online Inc., "AOL Instant Messenger", Aug. 29, 2000, Internet: www.aol.com/aim/ (18 pages).
America Online Inc., New AIM 4.7, Sep. 27, 2001, Internet: http://aim.aol.com (7 pages).
"Announce: Implementation of E-mail Spam Proposal," Maurice L. Marvin, news.admin.net-abuse.misc, Aug. 3, 1996, 2 pages.
"Better Bayesian Filtering," Paul Graham, Jan. 2003, pp. 1-11, http://www.paulgrahamcom/better.html.
CNET Networks Inc., "PopUp Killer", Sep. 13, 2001, Internet: download. cnet.com/downloads/0 -10059-100-6932612 shtml, (3 pages).
"Icq.anywhere, Email Features—Email Center—ICQ.com ," retrieved Apr. 29, 2004 from the World Wide Web: http://www.icq.com/email/popular-features.html, (5 pages).
"Idea for Online Networking Brings Two Entrepreneurs Together," Patents: Idea for Online Networking Brings Two Entrepreneurs Together, reprinted from http://www.nytimes.conn/2003/12/01/technology/technology-media-patents-idea-for-online-networking-brings-two-entrepreneurs.html Olpatt.html?acbmn1+0&adxnnlx=107029 . . . , printed on Nov. 5, 2004 (2 pages).
"Instant Messaging for Garmers," Pc Gamer, May 2004, vol. 11, No. 5, (2 pages).
"Learning Spam: Simple Techniques for Freely-Available Software," Bart Massey et al, Computer Science Dept., Portland, OR USA, 2003, pp. 1-14.
"Lotus Instant Messaging Everyplace FAQ," retrieved Apr. 29, 2004 from the World Wide Web: http://www.lotus.com/products/product4 . nsf/wdocs/249c6f083166cd3e85256d7300714407, (3 pages).
"Plaxo-Update Your Address Book," Plaxo Contact Networks, reprinted from http://web.archive.org/web/20030218233638/http://www.plaxo scorn/ printed on Nov. 5, 2004 (available on Feb. 18, 2003) (1 page).

(56) References Cited

OTHER PUBLICATIONS

"Reflections on Friendster, Trust and Intimacy," Danah Boyd. Ubicomp 2003, Workshop Application for the Intimate Ubiquitous Computing Workshop. Seattle, WA, Oct. 12-15, 2003, (4 pages).
"Six Degrees—New Programs Help Companies 'Mine Workers' Relationships for Key Business Prospects," William M. Bulkeley et al., Marketplace, The Wall Street Journal, Aug. 4, 2003, (3 pages).
"Social Network Fragments: An Interactive Tool for Exploring Digital Social Connections." Danah Boyd, Jeff Potter. Sketch at SIGGRAPH 2003. San Diego, California: ACM, Jul. 27-31, 2003, (1 page).
"Social Networking for Business: Release 0.5," Esther Dyson, Esther Dyson's Monthly Report, vol. 21, No. 10, Nov. 25, 2003, www.edventure.com, (36 pages).
"Support Vector Machines for Spa, Categorization," Harris Drucker et al., IEEE Transactions on Neural Networks, vol. 10, No. 5, Sep. 1999, pp. 1048-1054, (7 pages).
"Support Vector Machines," Marti Hearst, IEEE Intelligent Systems, Jul./Aug. 1998, pp. 18-28.
"Technical Solutions for Controlling Spam," Shane Hird, Proceedings of AUUG2002, Melbourne, Sep. 4-6, 2002, (17 pages).
Ed Bott and Ron Person, Using Windows 95 with Internet Explorer 4.0, Feb. 17, 1998, Que, Special Edition, (21 pages).
McKendrick, Joseph; "Internet Call Centers: New Era in Customer Service", Feb. 2002; VIO, n2, (4 pages).
Nick Wingfield; Technology Journal: Changing Chat—Instant Messaging is Taking Off, and For Some Users It's Nuzzling Out the Phone; Asian WSJ; Sep. 2000, (5 pages).
WebmasterWorld.com Inc., "HTML and Browsers", Mar. 5, 2001, Internet: www.webmaster.com/forum21/637.htm, (2 pages).
Convergys Interactive Alerts Reduce Customer Care Costs and Improve Customer Satisfaction; convergys.com; pp. 1-2, Jan. 22, 2002.
Upside, About Our Product; upsideweb.com; pp. 1-5, Nov. 2002.
"Digital Artifacts for Remembering and Storytelling: Post History and Social Network Fragments," Viegas et al., retrieved from the World Wide Web: http://we.media.mit.edu/-fviegas/papers/posthistory snfpdf, (10 pages), Jan. 2004.
"SVM-based Filtering of E-mail Spam with Content-specific Misclassification Costs," Aleksander Kolcz et al., TextDM '2001 (IEEE ICDM-2001 Workshop on Text Mining); San Jose, CA, 2001, pp. 1-14, Nov. 2001.
"Text Categorization with Support Vector Machines: Learning with Many Relevant Features," Thorsten Joachims, University of Dortmund, Computer Science Dept., LS-8 Report 23, 1998, (18 pages), Nov. 27, 1997, revised Apr. 19, 1998.
Home-tribe.net, http: //washingtondc stribe met/message/24434d lb-817b-4580 -aa42 -3bffal5 f26a?page=1, (4 pages), printed from Internet Dec. 13, 2004, message dated Oct. 19, 2003.
http://www.friendster.com, (17 pages), Dec. 2004.
USPTO Non-Final Office Action issued in U.S. Appl. No. 10/651,303, mailed May 1, 2009, 16 pages.
Office Action in U.S. Appl No. 10/974,969 dated: Mar. 17, 2008.
Office Action in U.S. Appl No. 10/974,969 dated: Mar. 6, 2009.
Notice of Allowance in U.S. Appl No. 10/974,969 dated: Sep. 8, 2009.
Office Action in U.S. Appl No. 11/408,166 dated: Mar 18., 2009.
Office Action in U.S. Appl No. 10/747,676 dated: Sep. 21, 2007.
Office Action in U.S. Appl No. 10/747,682 dated: Oct. 11, 2007.
Office Action in U.S. Appl No. 10/747,263 dated: Mar. 5, 2008.
Office Action in U.S. Appl No. 10/747,651 dated: Mar. 5, 2008.
Office Action in U.S. Appl No. 10/747,676 dated: Mar. 31, 2008.
Office Action in U.S. Appl No. 10/747,682 dated: Apr. 7, 2008.
Office Action in U.S. Appl No. 10/747,263 dated: Sep. 5, 2008.
Office Action in U.S. Appl No. 10/747,682 dated: Aug. 19, 2008.
Office Action in U.S. Appl No. 10/747,678 dated: Sep. 14, 2007.
Office Action in U.S. Appl No. 10/747,678 dated: Mar. 27, 2008.
Office Action in U.S. Appl No. 10/747,678 dated: Jun. 12, 2008.
Office Action in U.S. Appl No. 10/747,678 dated: Dec. 15, 2008.
Office Action in U.S. Appl No. 10/747,651 dated: Feb. 20, 2009.
Notice of Allowance in U.S. Appl No. 10/747,678 dated: Jun. 5, 2009.
Office Action in U.S. Appl No. 13/023,256 dated: Jun. 21, 2011.
Notice of Allowance in U.S. Appl No. 13/184,414 dated: Aug. 17, 2012.
Office Action in U.S. Appl No. 10/895,421 dated: Jan. 9, 2007.
Office Action in U.S. Appl No. 10/895,421 dated: Jun. 27, 2007.
Office Action in U.S. Appl No. 10/895,421 dated: Apr. 16, 2008.
Office Action in U.S. Appl No. 11/023,652 dated: Aug. 30, 2010.
Office Action in U.S. Appl No. 11/023,652 dated: May 12, 2011.
Office Action in U.S. Appl No. 11/023,652 dated: Sep. 24, 2012.
Office Action in U.S. Appl No. 12/236,255 dated: Sep. 17, 2010.
Office Action in U.S. Appl No. 12/236,255 dated: Apr. 2, 2010.
Office Action in U.S. Appl No. 13/189,972 dated: Sep. 2, 2011.
Notice of Allowance in U.S. Appl No. 12/689,699 dated: Oct. 9, 2012.
Office Action in U.S. Appl No. 11/408,166 dated: Sep. 2, 2010.
Office Action in U.S. Appl No. 11/408,166 dated: Apr. 13, 2011.
Office Action in U.S. Appl No. 11/408,166 dated: Oct. 17, 2011.

METHODS AND SYSTEMS FOR CAPTURING AND MANAGING INSTANT MESSAGES

CLAIM OF PRIORITY

This application claims priority to and is a continuation of U.S. patent application Ser. No. 10/825,617, filed Apr. 16, 2004, and titled "Managing Instant Messages," which claims priority under 35 USC §119(e) to U.S. Provisional Application Ser. No. 60/531,988, filed on Dec. 24, 2003, and titled "Managing Instant Messages," and U.S. Provisional Application Ser. No. 60/500,369, filed Sep. 5, 2003, and titled "IM Catcher," the entire contents of each application is hereby incorporated by reference.

TECHNICAL FIELD

This disclosure generally relates to managing instant messages.

BACKGROUND

Instant messages are conversational in nature. To maintain their conversational character, instant messages typically are communicated in real time to a user based on an indication that the user presently is online. Nevertheless, the conversational nature of instant messaging may subject a user who is visible online to undesired real-time advances or interruptions from other online entities. For example, a user who enters an online chat room may be subjected in real-time to instant messages from other individuals, known or unknown to the user, as well as from commercial entities, some of whom may purvey undesirable spam. Having entered an instant messaging conversation with a friend, the user may find the conversation overwhelmed in a cacophony of competing instant messaging voices, each demanding the user's immediate attention. Although the user may use a knock-knock (e.g., a pop-up window that provide the user the option to accept or reject an individual instant message based, for example, on an identification of the sender) to screen instant messages from entities not on a contact list of the user, a knock-knock, like the instant message that it represents, is obtrusive and steals the focus of the user from other tasks or conversations that are at hand.

SUMMARY

In one general aspect, managing instant messages may include receiving instant messages created by or on behalf of one or more message sources for delivery to an intended recipient. From among the received instant messages, qualifying instant messages are identified that satisfy a capture rule, and two or more of the qualifying instant messages are captured. The intended recipient is informed of the captured instant messages unobtrusively and the intended recipient is enabled to manage the captured instant messages.

Implementations may include one or more of the following features. For example, identifying qualifying instant messages that satisfy a capture rule may include identifying received instant messages for which a message source does not correspond to a contact of the intended recipient. A received instant message also may be identified as a qualified instant message based on a degree of separation between the intended recipient and the message source. Unsolicited marketing messages may be identified as qualified instant messages based, for example, on a heuristic and/or a Bayesian method. When the intended recipient is away or prefers not to be disturbed, for example, all received instant messages may be identified as qualified instant messages.

The intended recipient may be informed unobtrusively of captured instant messages without stealing focus from another interface for each instant message that is captured. The intended recipient also may be informed when at least one instant message is captured using an unobtrusive audible or visible cue.

Enabling management of the captured instant messages may include enabling the intended recipient to respond to at least one of the captured instant messages and/or to access information related to a message source associated with the captured instant messages. The intended recipient may be enabled to delete, ignore or block a captured instant message and/or a source of a captured instant message. Further, subsequent instant messages related to a previously deleted, ignored or blocked message or message source, in turn, may be deleted, ignored or blocked without being presented to the intended recipient. In sum, the capture rule may be modified (e.g., automatically or by the intended recipient) based on instant messages previously qualified or captured, for example, to capture or to pass-through subsequent instant messages from the source of a previously captured instant message.

The captured instant messages may be organized and/or presented to the intended recipient according to a plurality of predetermined categories. The predetermined categories may include, for example, categories for known, unknown, trusted and/or un-trusted messages or messages sources. The organization and presentation of the captured instant messaged may be configured by the intended recipient and/or automatically by a computer.

These general and specific aspects may be implemented using a method, a system, or a computer program, or any combination of systems, methods, and computer programs.

Other features will be apparent from the description, the drawings, and the claims.

DESCRIPTION OF DRAWINGS

Like reference symbols in the various drawings indicate like elements.

DETAILED DESCRIPTION

Instant messaging is powerful in its ability to interject itself into the recipient's online experience in order to initiate or further a real-time online conversation. The capabilities of instant messaging may enhance collaboration, networking, and the social value of users' online experiences. Nonetheless, absent the ability to manage receipt of instant messages, a user may find the potential benefits of instant messaging lost in an unrequited babble of insignificant or objectionable instant message voices.

Figure 1:
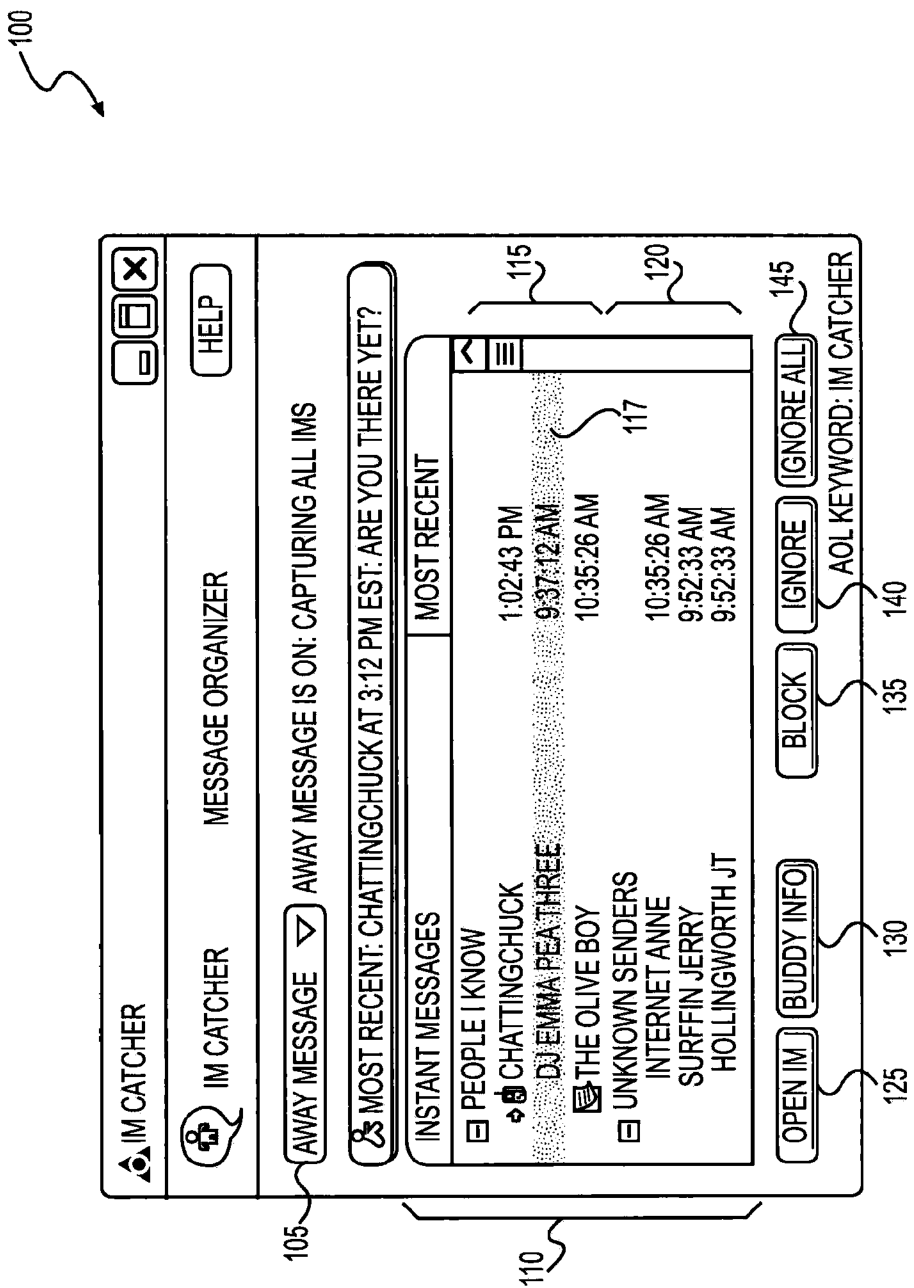
FIGS. 1-6 illustrate graphical user interfaces (GUIs) that may be used to manage instant messages directed to a user based on the user's online presence.

FIG. 1 illustrates a graphical user interface 100 (capture interface) that may be used to manage instant messages received by a user based on the user's online presence (e.g., the user's presence within a chat room or other online forum, and/or the user's present connection to the internet, using, for example, an internet service provider). Using button 105 (the "Away Message" button), the user has indicated to the capture interface 100 that the user presently is unavailable to receive instant messages. The capture interface 100, therefore, captures and organizes all of the instant messages 110 directed to the user while the user is away, and thereby provides the user with an effective and efficient way to handle the instant messages 110 upon returning.

The capture interface 100 is displayed initially when a first instant message is captured. When displayed initially, the capture interface 100 may pop to the front of all open windows or otherwise steal focus to alert the user of its activation. The capture interface 100 typically, however, will not steal focus upon receiving subsequent instant messages. To minimize distraction to the user, instant messages captured to the capture interface 100 do not generate a knock-knock when they are received and do not steal focus from other tasks or demand individualized attention of the user. Consequently, instant messages captured by the capture interface 100 may be deemed less intrusive by the user than instant messages presented to the user immediately or by using a knock-knock. The capture interface 100 may indicate the capture of additional instant messages using a subtle visible or audible cue, such as, for example, by playing a sound or by flashing an icon.

To assist the user in handling the instant messages 110, the instant messages 110 are categorized according to whether the message sender is known 115 or unknown 120 to the user. Furthermore, the instant messages within each category may be organized according to their time of receipt (as shown), or according to some other metric, such as, for example, a metric of anticipated importance or relevance. For each instant message 110 captured and categorized, the user is informed of an identity of the sender (e.g., a screen name) and the time at which the instant message was captured. Based on the information presented, the capture interface 100 enables the user to select a desired instant message, for example, instant message 117 from DJ Emma Pea Three.

Once an instant message is selected, the user may use a single click of a button to accept and open the instant message (using the "Open IM" button 125), to obtain more information regarding the message sender (using the "Buddy Info" button 130), to block all further instant messages from the sender of the instant message (using the "Block" button 135) or to ignore further instant messages from the sender of the instant message for the duration of the user's present online session (using the "Ignore" button 140). The user also may determine to ignore future instant message from all of the captured instant message senders for the duration of the user's online session (using the "Ignore All" button 145). The user may perform screening functions for a selected instant message without generating feedback or otherwise informing the sender of the user's attention to the instant message. Captured instant messages not handled expressly by the user, for example, may be deleted or ignored at the end of the user's online session or when the user closes the capture interface.

Figure 2:
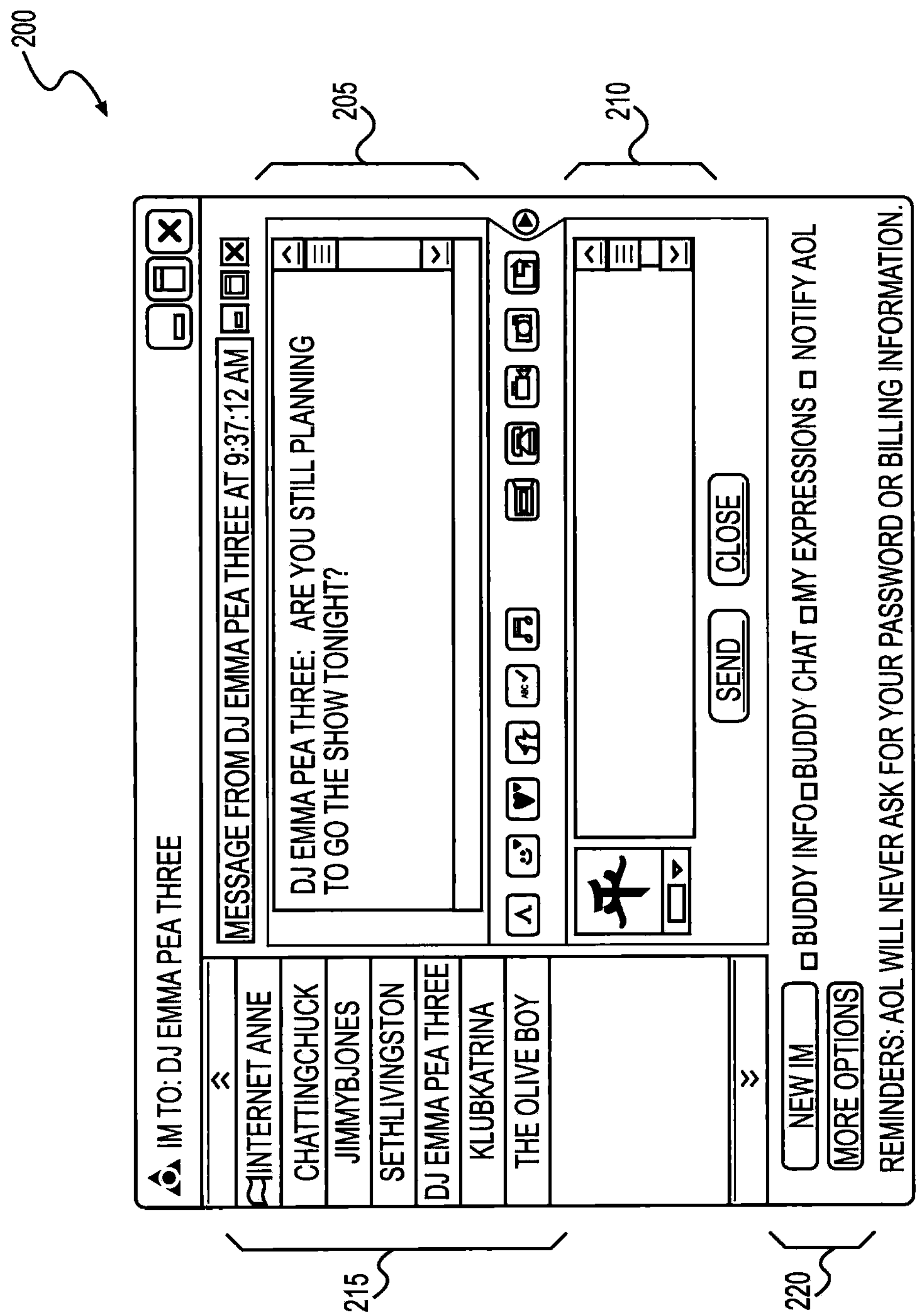

Referring to FIG. 2, the "Open IM" button 125 of the capture interface causes the selected instant message 117 to be presented to the user in a separate message interface 200. The message interface 200 includes a first pane 205 used to display the selected instant message 117 and a second pane 210 by which the user may compose and send an instant message reply. The message interface 200 includes tabs 215 to organize more than one active instant messaging conversation. The message interface 200 also may include controls (e.g., buttons 220) to access relevant instant messaging functionality, typically using only a single click.

Figure 3:
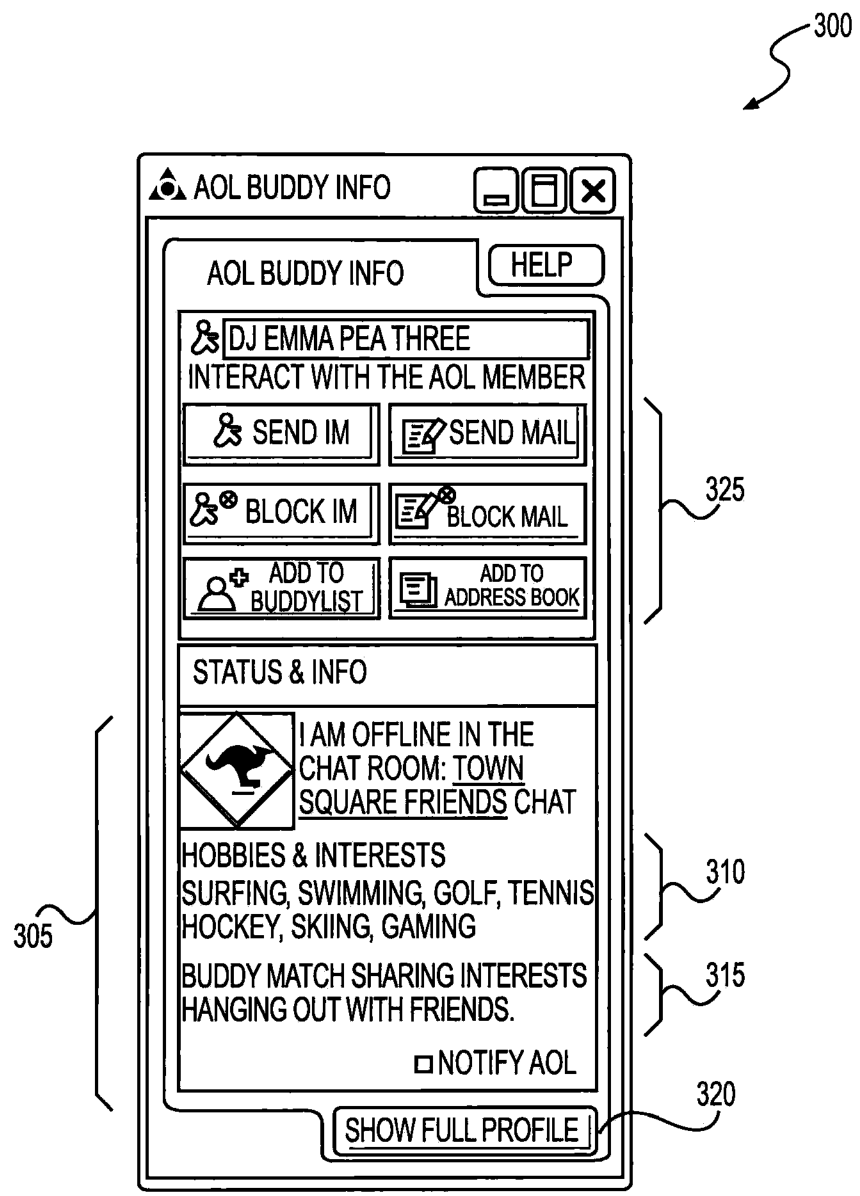

FIG. 3 illustrates a buddy info interface 300 invoked by activating the "Buddy Info" button 130 of the capture interface 100. The buddy info interface 300 provides additional information 305 regarding the sender, DJ Emma Pea Three, of instant message 117. For example, the buddy info interface 300 indicates that DJ Emma Pea Thee presently is online in the Town Square Friends Chat room. The buddy info interface also indicates hobbies and interests 310 of DJ Emma Pea Three as well as interests 315 that DJ Emma Pea Three shares with the user. Button 320 provides access to additional information regarding DJ Emma Pea Three, such as, for example, a phone number, an address, an email address, an age, a gender, family information, educational information, career information, and/or an expertise. Buttons 325 are provided to enable the user to access with one click basic instant messaging options related to DJ Emma Pea Three, such as, for example, to send or block instant messages to or from DJ Emma Pea Three or to add DJ Emma Pea Three to a contact list of the user. The user may use the information provided by the buddy info interface 300 to judge, for example, whether an unknown sender is a person (for whom additional information likely is available) or a software bot (for which additional information likely is not available).

Figure 4A:
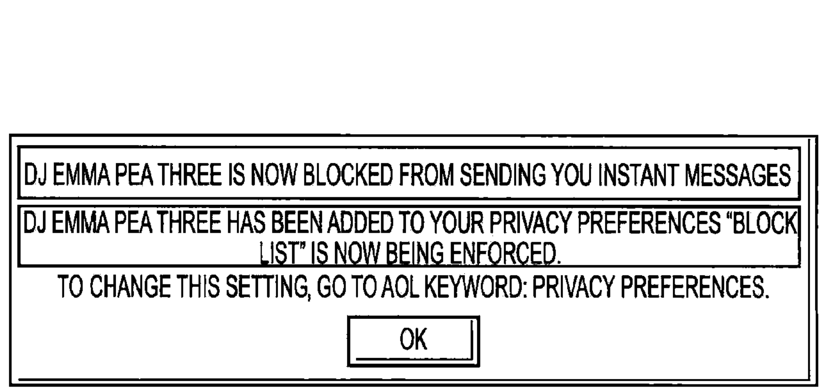
Figure 4B:
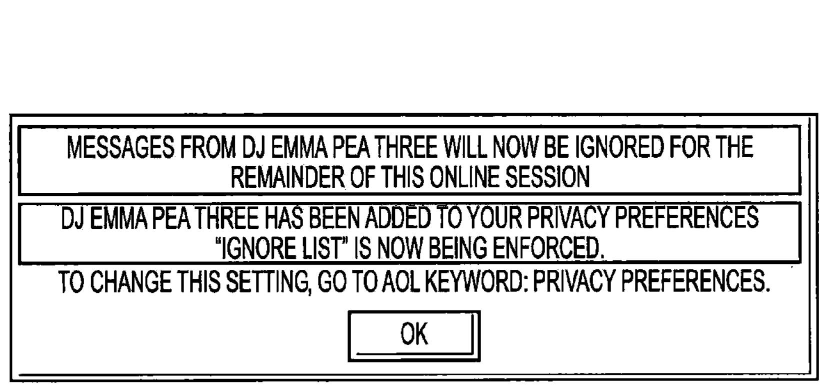
Figure 4C:
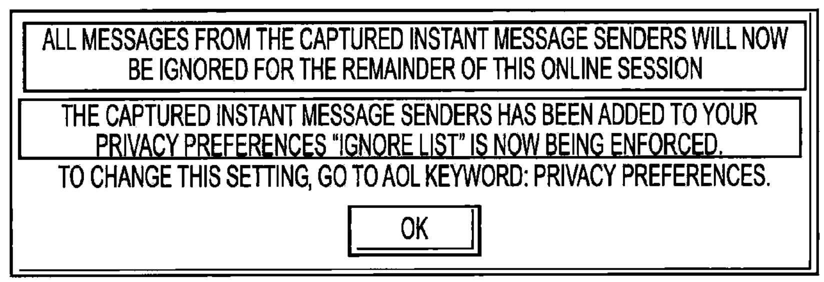

FIGS. 4A through 4C illustrate interfaces 400, 430 and 460 that are used, respectively, to confirm that the user desires to execute the screening function of the "Block" button 135, the "Ignore" button 140, or the "Ignore All" button 145 of the capture interface 100.

Figure 5:
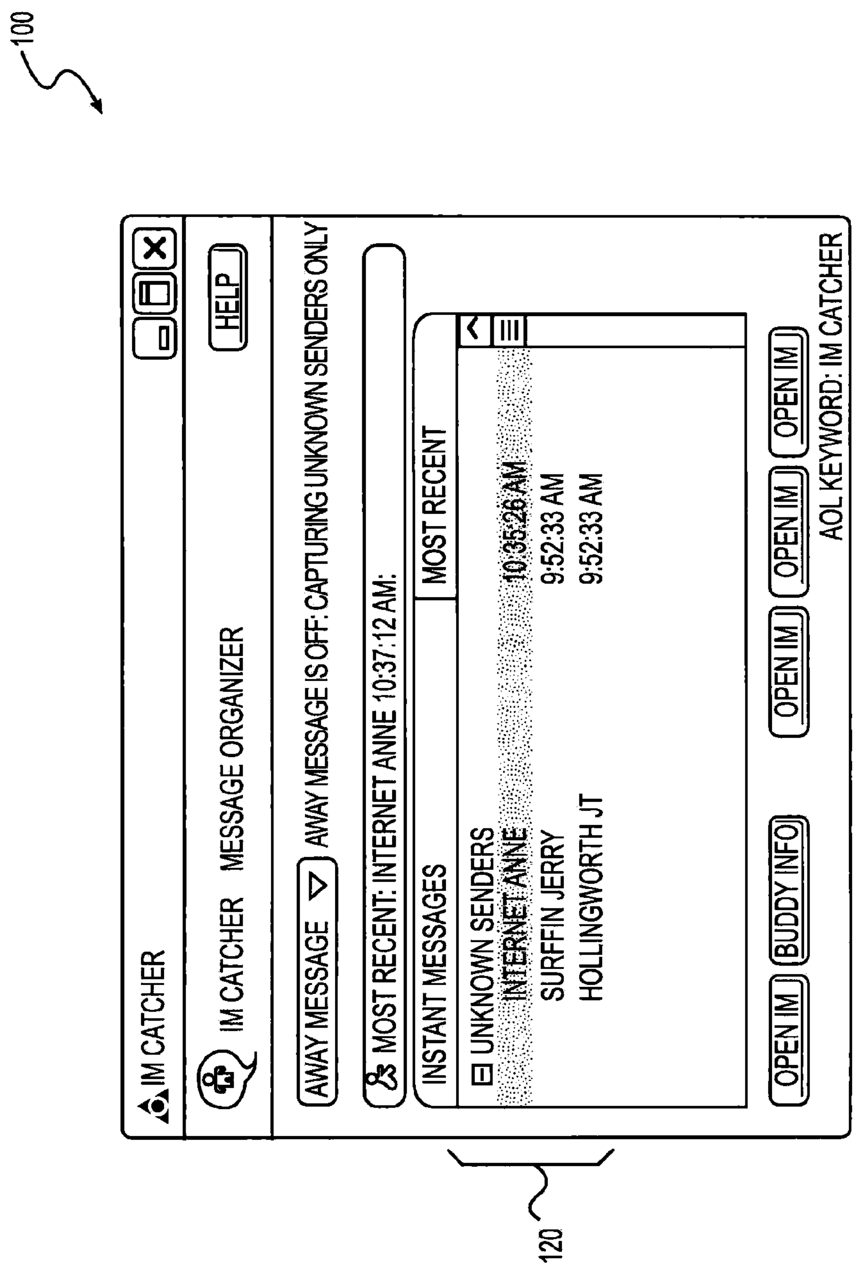
Figure 6:
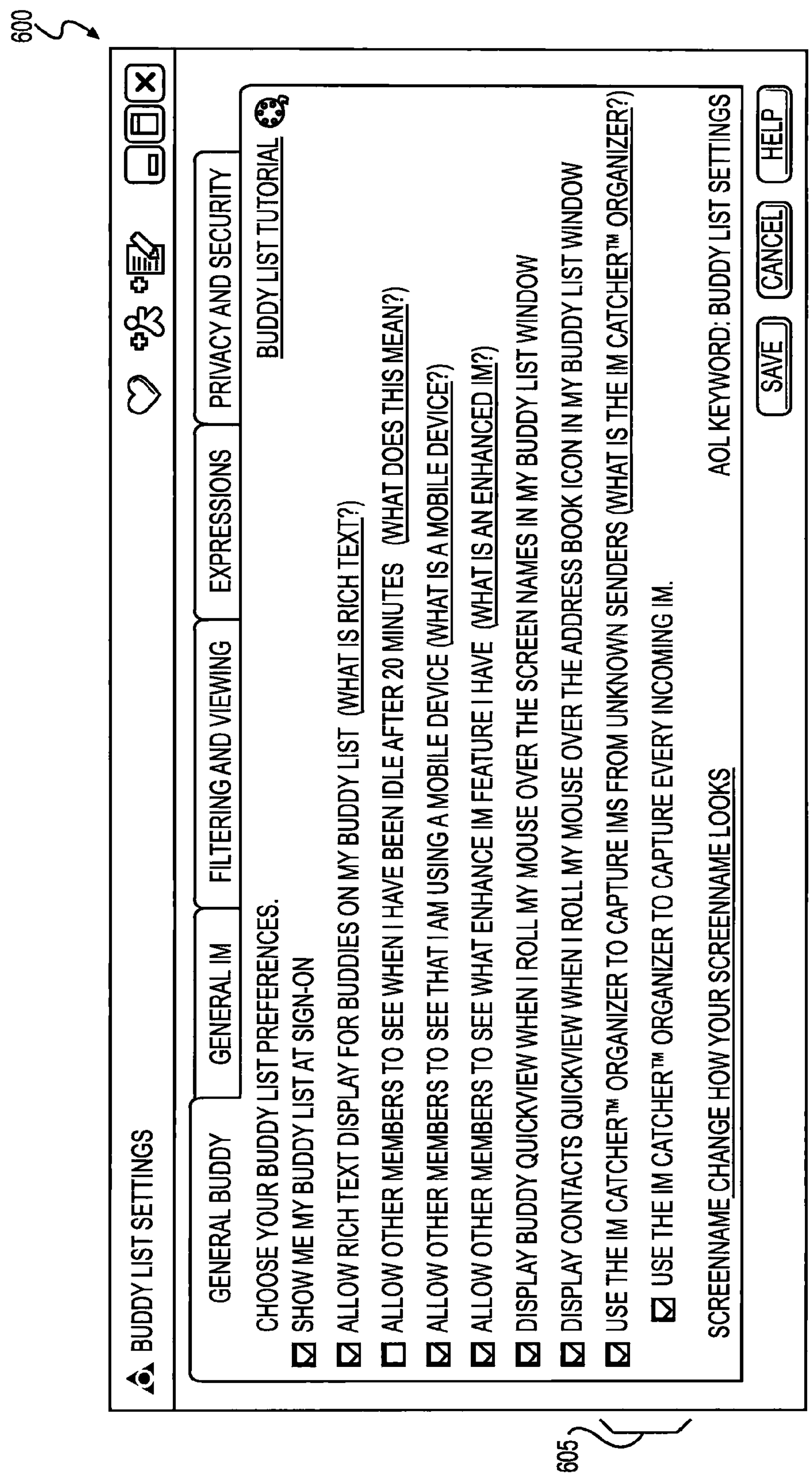

FIG. 5 illustrates the capture interface 100 in which the user is indicated to be present rather than away. The interface 100 is configured to capture only instant messages of unknown senders 120 when the user is present and to allow known senders to approach and interact freely with the user. Nevertheless, referring now to configuration interface 600 of FIG. 6, the user may use configuration settings 605 to configure the capture interface 100 to capture all instant messages, whether from known or unknown senders or whether the user is present or away. Additional configurations also may be provided, for example, to capture instant messages only of particular senders or to capture instant messages only at particular times or during particular contexts (e.g., when the user is engaged actively in a different instant message exchange that it would be perceived as rude to interrupt).

Figure 7:
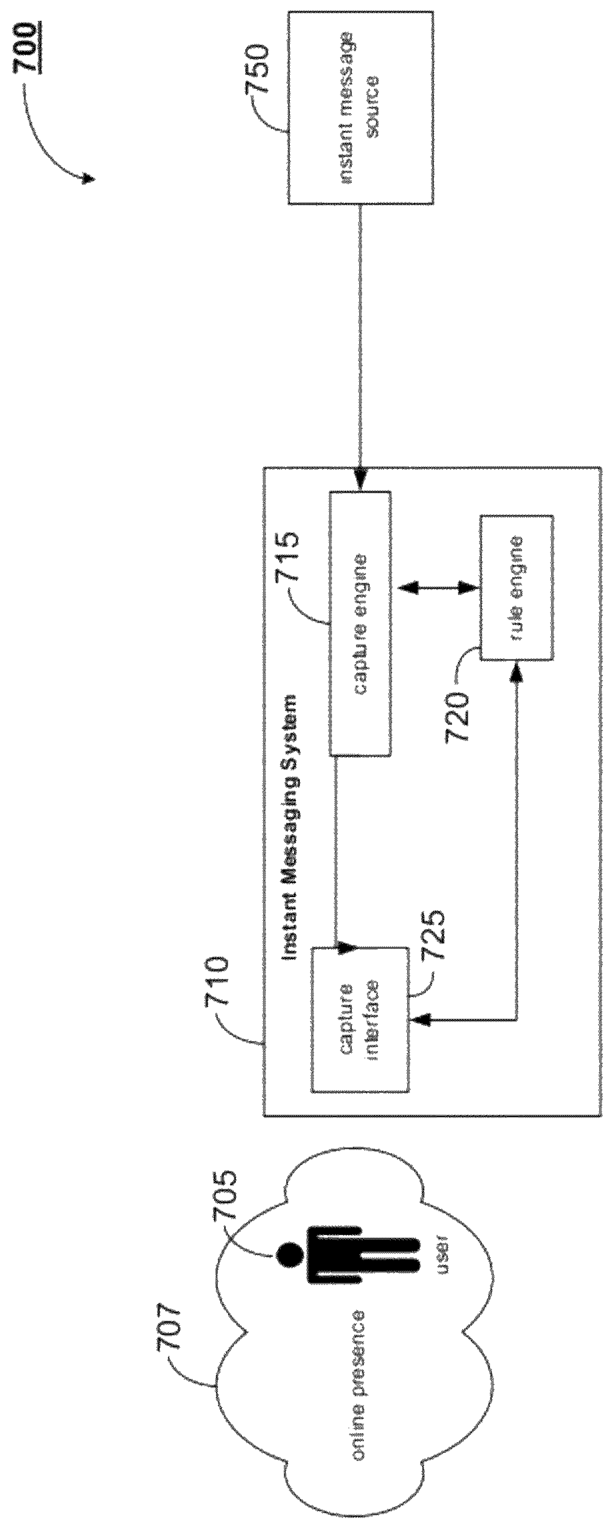
FIG. 7 is a schematic diagram of a communication system capable of managing instant messages directed to a user based on the user's online presence.

FIG. 7 shows a generalized system 700 for communicating instant messages to a user 705. System 700 includes an instant messaging system 710 that manages instant messages provided to the user 705 in real time by an instant message source 750 based on an online presence 707 of the user. Instant messaging system 710 may be implemented, for example, as a client system, as a host system, or as some combination of these or other systems. The instant messaging system 710 includes a capture engine 715, a rule engine 720, and a capture interface 725. The instant messaging system 710 may include or be included in a general-purpose or a special-purpose computer (e.g., a personal computer, a PDA, a mobile telephone, or a device specifically programmed to perform certain tasks), a database, a local area network, and/or a wide area network. The instant messaging system 710 may include any appropriate architecture or combination of architectures, such as for example, a client architecture and/or a host architecture.

The capture engine 715 is configured to capture one or more instant messages directed to the user 705 by the instant message source 750 based on interaction with the rule engine 720. The rule engine 720 compares incoming instant messages to a capture rule, and informs the capture engine 715 if the capture rule is satisfied. If the instant message satisfies the capture rule, the capture engine 715 captures the instant message to manage the instant message for the user 705. The capture interface 725 informs the user 705 of the captured instant messages in an organized fashion and without disrupting the user's other online activities. The capture interface 725 also enables the user 705 to respond to or to otherwise manage the captured instant messages.

The capture engine 715 captures the instant messages based on input from the rule engine 720 that the instant message satisfies a capture rule. The capture engine 715 may include a database to hold captured instant messages and may communicate information descriptive of the captured instant messages to the capture interface 725. The information descriptive of the captured instant messages may include, for example, an identifier of the message source, a time stamp of the instant message, a portion or summary of the instant message contents, and/or a pointer to the instant messages. In addition, or in the alternative, the capture engine 715 may tag or otherwise identify the instant messages as captured and may provide the captured instant message to the capture interface 725 for handling, storage and/or management.

The rule engine 720 enables the system or an administrator of the system to generate a capture rule. Alternatively, or in addition, the rule engine 720 may enable the user 705 or a supervisor of an online account of the user 705 to define one or more aspects of the capture rule. The capture rule may describe, in whole or in part, one or more conditions to be satisfied for an instant message to be captured. For example, the capture rule may base capture upon an identify of the message source 750, an attribute of the message, a preference or context (e.g., the user is away) of the user 705, or some combination of these or other factors. In any event, the rule engine 720 analyzes incoming instant message for satisfaction of the capture rule.

The capture interface 725 may be used to manage the instant messages directed to the user 705 while the user 705 is online. The capture interface 725 itself may receive and store the instant message or may reference and access instant messages captured and stored by another service, system or device (e.g., the capture engine 715). In any event, the capture interface 725 enables the user 705, for example, to organize, treat, respond to, block, or ignore the captured instant messages. The capture interface 725 also may enable the user 705 to modify the capture rule of the rule engine 720. For example, the capture interface 725 may enable the user to modify the capture rule directly, or may modify the capture rule automatically based upon treatment by the user 705 of one or more captured instant messages. Generally, the capture interface 725 may function similarly to capture interface 100 described with respect to FIGS. 1-6.

The instant message source 750 typically may include any source of an instant message. The instant message source 750 may employ one or more protocols to transfer information internally or to communicate the instant message to the user 705.

Both the instant messaging system 710 and the message source 750 further may include various mechanisms for delivering data. The various mechanisms may include, for example, any applications, protocols, devices, or networks used to facilitate communication of electronic data. Both the instant messaging system 710 and the message source 750 also may include or be included in a general-purpose or a special-purpose computer, a local area network, and/or a wide area network. The response to and execution of instructions received by the instant messaging system 710, the message source 750, or any of their components (collectively the system services), may be controlled by, for example, a program, a piece of code, an instruction, a device, a computer system, or a combination thereof, for independently or collectively instructing the system services to interact and operate as described herein.

Figure 8:
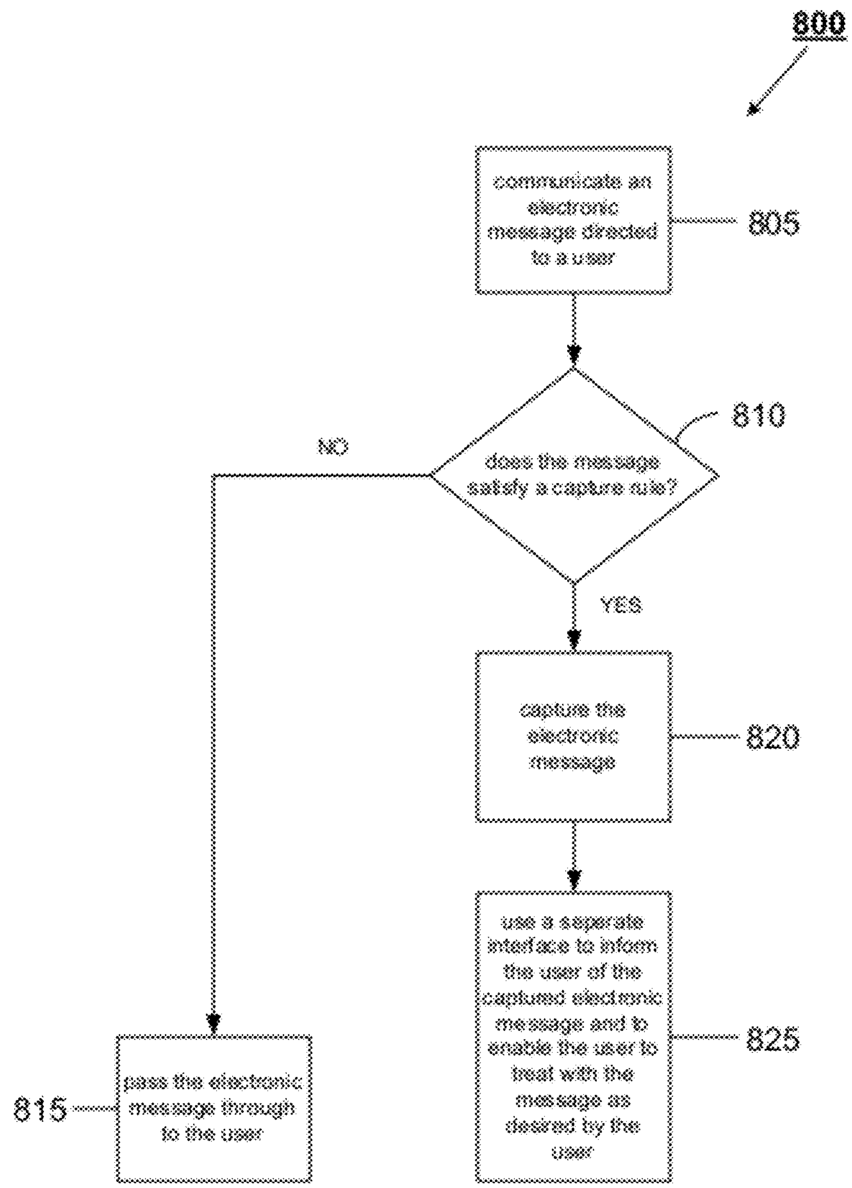
FIG. 8 is a flow diagram of a process implementable by the communication system of FIG. 7.

FIG. 8 illustrates a flow diagram of a process 800 implementable by, for example, the system 700 of FIG. 7 to manage instant messages directed to the user 705. The instant message source 750 communicates instant messages directed to the user 705 to the instant messaging system 710 (step 805). The capture engine 715 uses the rule engine 720 to determine whether the instant messages satisfy a capture rule (step 810). If an instant message fails to satisfy the capture rule, that instant message is not captured and, instead, is passed through to the user (step 815). Otherwise, when an instant message satisfies the capture rule, the capture engine 715 captures the instant message (step 820). To inform the user 705 of the captured instant messages, the capture engine 715 communicates the captured instant messages and/or information indicative of those messages to the capture interface 710 (step 825). The capture interface 725 enables the user 705 to handle the captured instant messages individually or as groups, and otherwise to respond to or to manage the instant messages as desired (step 825).

Figure 9:
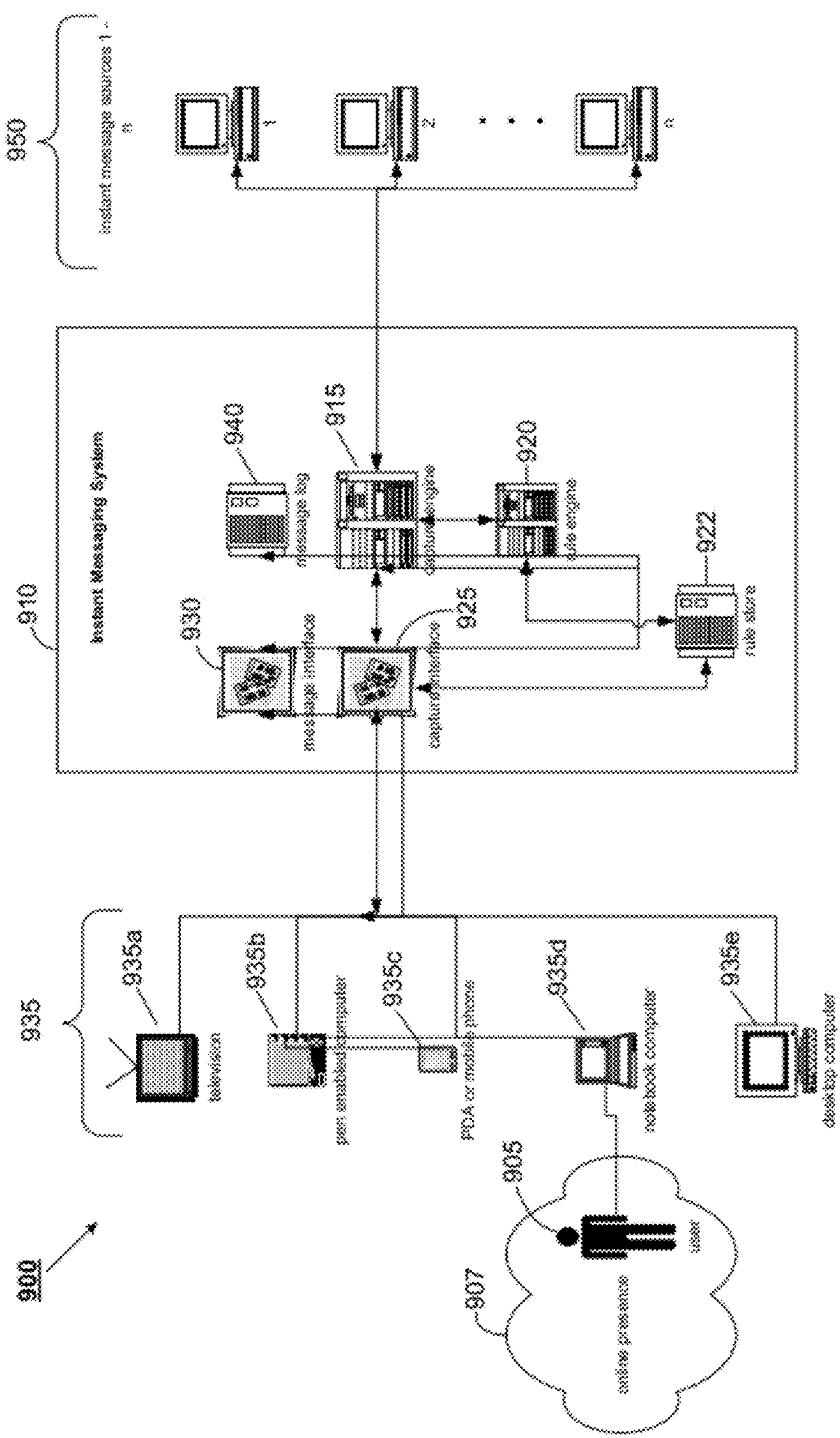
FIG. 9 is a schematic diagram of an instant messaging system that manages instant messages directed to a user based on the user's online presence.

Referring to FIG. 9, a generalized communication system 900 communicates instant messages generated by one or more instant message sources 950 to a user 905 having an online presence 907. The online presence 907 may include, for example, activity of the user 905 in browsing the internet, participating in an active instant messaging session, using an internet enabled television or game console, using a networked radio, or participating in a chat room discussion. The online presence 907 also may include an online presence of the user 905 at a particular device. Exemplary components of the communication system 900 are described in greater detail below.

The communication system 900 includes one or more message sources 950. The message sources 950 typically include different individuals, services, or other sources of instant messages, such as, for example, friends or family of the user 905, persons not known by the user 905, commercial entities, and/or one or more software bots that automatically direct messages to the user 905. The instant messages may include, for example, a personal message, a promotional advertisement, an account balance, a portfolio status, a credit status, an online status, information that an order and/or a service is complete, or a message regarding confirmation, cancellation, and/or rescheduling of an appointment. Other examples include, but are not limited to, a weather forecast and/or adverse weather conditions of a particular geographic region; an online status of another user; or entertainment programming and/or ticket information. As a practical matter, the message sources 950 may provide many instant message to the user 905 that are unsolicited and/or undesired.

The message sources 950 may employ one or more protocols (i.e., standards, formats, conventions, rules, and structures) to transfer information internally or to communicate instant messages to the user. Protocols employed by the message sources 950 may include, for example, the Internet protocol (IP), the transfer connection protocol (TCP), the hypertext transfer protocol (HTTP), the file transfer protocol (FTP), the user datagram protocol (UDP), the layer two tunneling protocol (L2TP), the simple mail transfer protocol (SMTP), the short message service (SMS), the enhanced message service (EMS), and/or the multimedia message service (MMS).

The communication system 900 includes an instant messaging system 910 that manages instant messages provided to the user 905 by the instant message sources 950 based on the online presence 907 of the user. The instant messaging system 910 includes a capture engine 915, a rule engine 920 having a rule store 922, a capture interface 925, and a message interface 930 (the system components). The instant messaging system 910 may include or be included in a general-purpose or a special-purpose computer (e.g., a personal computer, a PDA, a mobile telephone, or a device specifically programmed to perform certain tasks), a database, a local area network, and/or a wide area network. The instant messaging system 910 may include any appropriate architecture or combination of architectures, such as for example, a client architecture and/or a host architecture.

The instant messaging system 910 typically allows direct or indirect communication between the various system components, the user 905 and the instant message sources 950, irrespective of physical or logical separation. The instant message system 910 may include, for example, various mechanisms for communicating data, such as, for example, the short message service (SMS), the enhanced message service (EMS), the multimedia message service (MMS), the wireless application protocol (WAP), the transport connection protocol (TCP), the Internet protocol (IP), the World Wide Web, one or more local area networks, and/or one or more wide area networks. The instant messaging system 910 also may include analog or digital wired and wireless telephone networks, such as, for example, public switched telephone networks (PSTN), integrated services digital networks (ISDN), various types of digital subscriber lines (xDSL), advance mobile telephone service (AMPS), global system for mobile communications (GSM), general packet radio service (GPRS), code division multiple access (CDMA), radio, cable, satellite, and/or other delivery mechanisms for carrying data. The communications of the instant message system 910 may employ secured and/or unsecured communication systems.

Components of the instant messaging system 910 are described in greater detail below.

The capture engine 915 corresponds generally to the capture engine 715 of FIG. 7. Capture engine 915 is configured to capture an instant message based on an indication by the rule engine 920 that a capture rule is satisfied. If the capture rule is not satisfied, then the capture engine 915 is configured to pass the instant message through to the message interface 930 for immediate display to the user 905. The capture engine 915 may or may not store the instant messages that are captured. For example, in one implementation, the capture engine 915 stores the captured instant messages and forwards information indicative of the instant messages to the capture interface. In another implementation, the capture engine 915 merely forwards to the capture interface 925 those instant messages identified for capture and the capture interface provides or obtains any required storage.

The rule engine 920 is configured to compare the instant messages to a capture rule of the rule store 922 and/or to analyze the instant message in view of the capture rule. The rule engine 920 may perform, for example, Bayesian or heuristic analysis of the instant messages based on the capture rule. The rule engine 920 is configured to inform the capture engine 915 when an instant message satisfies the capture rule.

Generally, the capture rule may define, in whole or in part, one or more conditions to be satisfied by the source, content, and/or timing of an instant message before capture of the instant message. The capture rule may be generated by the system or by an administrator of the system. The capture rule also may be based on preferences of the user, whether provided by the user or determined automatically by the system in view of user behavior. In short, the capture rule may enable the user 905 flexibly to manage which instant messages are received directly, which instant messages are blocked completely, and which instant message are captured to be screened by the user 905.

The capture rule may include a white list defining approved instant message sources 950 (e.g., family, friends, or co-workers) and/or a black list defining objectionable instant message sources 950 (e.g., known purveyors of offensive spam) that are to be blocked. The white list and/or black list may be based on input of a rating authority or by a community of raters. Although the white list or the black list may be provided initially as a default, the user may be enabled to modify or replace either the white list or the black list to better fit the user's preferences.

Message source categories (e.g., individual, business, or business:gambling) also may be used to control communication with instant message sources 950 that include an associated category label. For example, a message source 950 may be identified as an online casino by an associated category label of "business:gambling" and may be restricted based on that label. Generally, to communicate an instant message to the user 905, a message source may be required to provide meaningful and trustworthy information by which the message source may be identified and/or classified.

The capture rule also may control capture, filtering, or ranking of an instant message based on a degree of separation between the user 905 and the message source 950 under a rationale, for example, that the user is more inclined to receive an instant message from a friend of a friend than from an individual not connected to the user. More specifically, the degree of separation between the user 905 and the message source 950 describes a number of intermediary relationships needed to link the user and the message source. Typically, user contact lists (e.g., address book, buddy list, and/or white list) are evaluated to determine the number of degrees (or relationships) needed to link two users.

Figure 10:
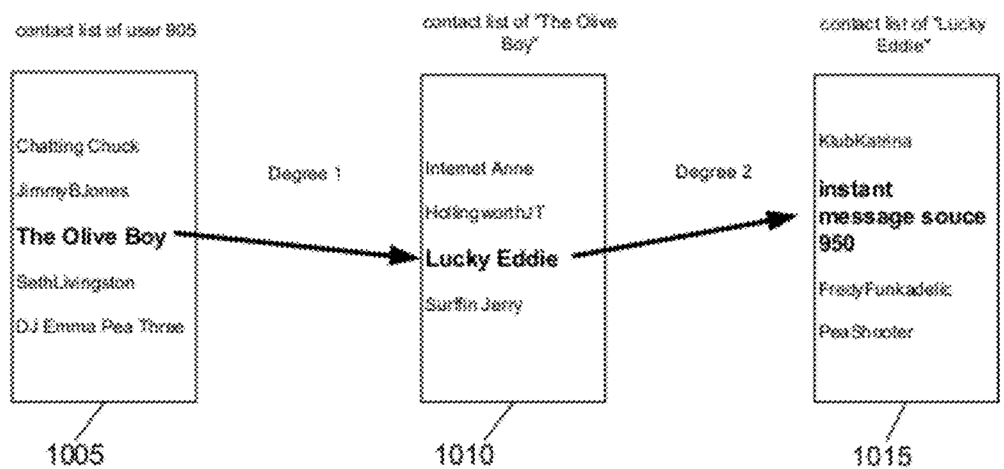
FIG. 10 illustrates a relationship between a user and an instant message source having two degrees of separation.

Referring briefly to FIG. 10, for example, the user 905 may link to the instant message source 950 through two degrees of separation based on contact lists of the user, "The Olive Boy," and of "Lucky Eddie." More specifically, the user has a contact list 1005 that lists "The Olive Boy." The contact list 1010 of "The Olive Boy," in turn, lists "Lucky Eddie," whose contact list 1015 lists the instant message source 950—and establishes the connection between the user 905 and the message source 950. Here, the user 905 is linked to the message source 950 by two degrees of separation (the relationship between "The Olive Boy" and "Lucky Eddie" providing the first degree, and the relationship between "Lucky Eddie" and the instant messaging source 950 providing the second degree). Stated differently, the user 905 is related to "Lucky Eddy" by one degree of separation (i.e., their common relationship to "The Olive Boy"), and "The Olive Boy" is separated from the instant message service 950 by one degree of separation (i.e., their common relationship to "Lucky Eddie"). Similarly, the user 905 and "The Olive Boy," "The Olive Boy" and "Lucky Eddie," and "Lucky Eddie" and the instant message source 950 each respectively are separated by zero degrees of separation.

In short, the capture rule may control capturing, filtering, or ranking of an instant message based on: (1) whether the user 905 and the messages source 950 are discernibly linked; and (2) if they are linked, the number of degrees of separation (e.g., relationships or intermediaries) needed to complete the link.

Referring back to FIG. 9, the capture rule also may include other rule information, such as, for example, key words and/or parameters useful for analyzing natural language. The capture rule may enable the rule engine 920 to restrict instant messages based upon textual analysis of their content. More specifically, the capture rule may enable the rules engine 920 to analyze the language of an instant message to determine whether the instant message includes offensive language or subject matter, or whether the language used is indicative of an unsolicited spam message. The user may be enabled to select or modify the information or algorithms used to screen the online content based on the textual analysis. For example, the capture rule may include user defined dictionaries of terms that may cause an instant message to be delivered immediately, blocked, or passed through when included in the instant message.

The capture rule may enable the user to specify times during which instant messages may or may not be received. For example, the user may restrict receipt of instant messages between the hours of 8:30 am and 5 pm during the work week, but may allow instant messages to be received with less restriction during the evenings and on the weekends while the user is not at work. More specifically, the user may use the capture rule to specify that, during working hours, instant messages of co-workers or clients are to be received, spam messages are to be blocked, and messages from friends or family are to be captured. On the other hand, when not at work, instant messages from co-workers and clients may be captured while messages from friends and family are received immediately.

Additional rule information also may be included, such as, for example, logging or reporting rules. The logging or reporting rules, for example, may indicate provision of a message log 940 to record all of the instant messages directed to the user 905 whether in the present or a past online session. The message log 940 may record whether the instant message was captured and what, if any, activity the user took with respect to the instant message.

The rule store 922 generally receives, stores and administers rule information used to supervise instant messaging by the instant messaging system 910. The rule store 922 may include one or more databases that may reside at any appropriate location (e.g., local location, remote location, or third party location), and also may reside on any appropriate storage medium, such as, for example, a magnetic disc array, or an optical disk array. These databases may be included in a single physical or logical structure, or they may be physically or logically distinct. The rule store 922 generally includes a data structure that enables the rule information and/or other information to be organized and accessed quickly and efficiently. For example, the rule store 922 may organize rule information using fields, records, or files. The rule store 922 may include database management systems that organize data based on relational, network, flat, or hierarchical architectures. The rule store 922 also may include a hypertext database to link data objects such as text, images, or video to other data objects. The rule store 922 may store the rule information locally, remotely, or in a distributed fashion. In any event, the rule store 922 organizes the rule information for effective access and use by the rule engine 920.

Capture interface 925 may function similarly to capture interface 100 described with respect to FIGS. 1-6. The capture interface 925 receives captured instant messages or information indicative of those messages from the capture engine 915 for display to the user 905. The capture interface, alone or in conjunction with other services, may perform sorting, prioritizing, or other types of organizational processing on the captured instant messages to enable the user 905 to manage the instant messages. For example, the capture interface 925 may prioritize captured instant messages based on a predicted relevance or likelihood of interest. The predicted relevance or likelihood of interest may be related to the subject matter and/or source of an instant message. For example, the capture interface 925 may give a higher priority to an instant message from an individual not known to the user but who is indicated to share a common interest than is given to an instant message from a software bot that presents a marketing invitation having objectionable content.

The capture interface 925 also may enable the user 905 to modify the capture rule of the rule engine 920. For example, the capture interface 925 may enable the user to modify the capture rule directly, or may modify the capture rule automatically based upon treatment by the user 905 of one or more captured instant messages. The capture interface 925 may display to the user 905 a source of an instant message, a time stamp, a count of the number of instant messages sent and/or received, a summary of instant message content, and/or the captured instant messages themselves. The capture interface 925 may enable the user to approve, block or ignore one or more instant messages or instant message sources. Generally, the capture interface 925 enables the user 905 to organize, respond to, block, ignore, or otherwise manage instant messages in a manner similar to that which was described with respect to the interfaces of FIGS. 1-6.

The capture interface 925 may include or operate in conjunction with one or more of the fixed or mobile communication devices 935, whether wired or wireless. The fixed or mobile communication devices 935 may include any device, system, and/or piece of code that relies on another service to perform an operation. For example, the communication devices 935 may include a device such as a television **935*a*, a pen-enabled computer 935*b*, a personal digital assistant (PDA) or mobile telephone 935*c*, a notebook computer 935*d*, and/or a desktop computer 935*e*. The communication devices 935 also or alternatively may include, for example, a Web browser, an instant messaging (IM) client, a synchronization client (e.g., a calendar synchronization client or a task list synchronization client), a short message service (SMS) client, a business productivity application (e.g., a word processing program or a spreadsheet program), and/or an operating system or operating system kernel residing on a device. The communication devices 935 may be arranged to operate within or in concert with one or more other systems, such as, for example, the Internet, the World Wide Web, a WAN (wide area network), a LAN (local area network), analog or digital wired and wireless telephone networks (e.g., PSTN, ISDN, or xDSL), radio, television, cable, satellite, and/or any other delivery mechanism for carrying data. In any event, the capture interface 925 enables the user 905**, for example, to organize, treat, respond to, block, or ignore the captured instant messages.

One or more other services may be included in the components of communication system 900 and/or these components (hereinafter the system services) may be included as part of one or more other services. For example, the system services may include or be included in a general-purpose or a special-purpose computer (e.g., a personal computer, a PDA, or a device specifically programmed to perform certain tasks), a database, a local area network, and/or a wide area network. In any event, the response to and execution of instructions received by any or all of the system services may be controlled by, for example, a program, a piece of code, an instruction, a device, a computer system, or a combination thereof, for independently or collectively instructing the services to interact and operate as described herein.

Figure 11:
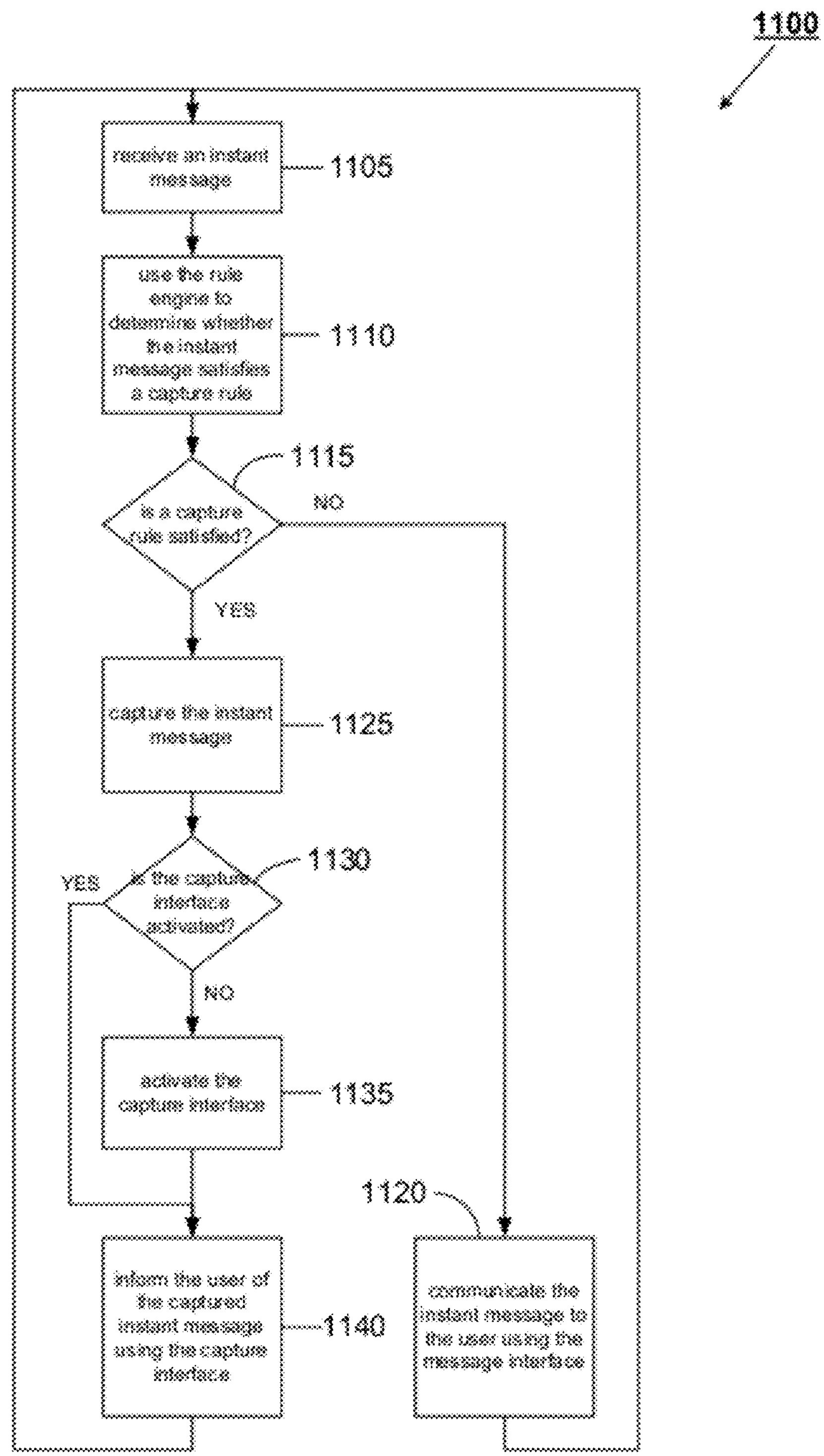
FIG. 11 is a flow diagram illustrating an exemplary process implementable by the system of FIG. 9.

FIG. 11 illustrates a flow diagram of a process 1100 implementable by, for example, the system 900 of FIG. 9 to manage instant messages directed to the user 905. An instant message initially is received from a message source 950 by the capture engine 915 (step 1105). The rule engine 920 is used to determine whether the instant message satisfies a capture rule (step 1110). If a capture rule is not satisfied (step 1115), the instant message is communicated to the user 905 using the message interface to grab the user's immediate attention (step 1120). The system then waits for receipt of the next instant message directed to the user 905 (step 1105).

If a capture rule is satisfied (step 1115), the instant message is captured by the capture engine 915 (step 1125). The capture interface 925 may be configured to be activated automatically when a first instant message is captured during an online session. In addition, or in the alternative, the capture interface 925 may be configured to be activates based on an input or a request of the user 905. If the capture interface 925 is not activated already (step 1130), then the instant messaging system 910 activates the capture interface 925 (step 1135). In any event, once the capture interface is activated (step 1135) or is determined already to be active (step 1130), the instant message and/or information indicative of the instant message is communicated to the capture interface 925 to inform the user 905 of the instant message and to enable the user to manage the instant message and any other instant messages that have been captured (step 1140). The system then waits for receipt of the next instant message directed to the user 905 (step 1105).

Other implementations are within the scope of the following claims.

What is claimed is:

1. A system comprising:

at least one processing device;

a storage device storing instructions, which when executed by the at least one processing device, cause the at least one processing device to implement:

an input interface configured to receive electronic messages created by or on behalf of one or more message sources for delivery to an intended recipient;

a screening component configured to identify, from among the received electronic messages, qualifying electronic messages that satisfy a capture rule, and capture, as captured electronic messages, a plurality of the qualifying electronic messages; and an output interface configured to inform the intended recipient of the captured electronic messages and to enable the intended recipient:

to organize the captured electronic messages according to a plurality of predetermined categories and manage the captured electronic messages;

to access information related to a message source associated with at least one of the captured electronic messages; and to indicate that future electronic messages from the message source are not to be captured.

2. The system of claim 1, wherein the output interface further enables the intended recipient to indicate that future electronic messages from the message source are to be blocked.

3. The system of claim 2, further comprising instructions that cause the processing device to implement:

a blocking component that captures and deletes the future electronic messages without presenting the future electronic messages to the intended recipient.

4. The system of claim 1, wherein the output interface further enables the intended recipient to modify the capture rule based on at least one of the captured electronic messages.

5. The system of claim 1, wherein the output interface is configured to inform the intended recipient of the captured electronic messages according to the plurality of predetermined categories.

6. The system of claim 1, wherein the predetermined categories comprise a category for captured electronic messages received from message sources known to the intended recipient.

7. The system of claim 1, wherein the predetermined categories comprise a category for captured electronic messages received from message sources not known to the intended recipient.

8. The system of claim 1, wherein the predetermined categories comprise a category for captured electronic messages received from message sources trusted by the intended recipient.

9. The system of claim 1, wherein the predetermined categories comprise a category for captured electronic messages received from message sources not trusted by the intended recipient.

10. The system of claim 1, wherein the screening component indicates that an electronic message qualifies for capture if the message source of the electronic message does not correspond to a contact on a contact list of the intended recipient.

11. The system of claim 1, wherein the output interface further enables the intended recipient to delete at least one of the captured electronic messages.

12. The system of claim 1, wherein the output interface further enables the intended recipient to ignore or block at least one of the captured electronic messages.

13. The system of claim 1, wherein the output interface is configured to generate an unobtrusive audible or visible cue when at least one of the qualifying electronic messages is captured.

14. A tangible computer readable storage medium storing a computer program, the computer program comprising:

a receiving code segment that causes a processor to receive electronic messages created by or on behalf of one or more message sources for delivery to a user;

a screening code segment that causes a processor to identify, from among electronic messages intended for the user, qualifying electronic messages that satisfy a capture rule, and to capture, as captured electronic messages, a plurality of the qualifying electronic messages; and an interface code segment that causes a processor to inform the user of the captured electronic messages and to enable the user to manage the captured electronic messages, the interface code segment comprising:

a query code segment that causes a processor to access information related to a message source of a captured electronic message;

a managing code segment that causes a processor to enable the user to delete, ignore or block at least one of the captured electronic messages; and an organization code segment that causes a processor to organize the captured electronic messages according to a plurality of predetermined categories.

15. The computer readable storage medium of claim 14, wherein the predetermined categories include comprise a category for captured electronic messages of message sources trusted by the user.

16. The computer readable storage medium of claim 14, wherein the predetermined categories include comprise a category for captured electronic messages of message sources not trusted by the user.

17. The computer readable storage medium of claim 14, further comprising a learning code segment that causes a processor to modify the capture rule based on at least one of the captured electronic messages.

18. The computer readable storage medium of claim 17, wherein the learning code segment further causes a processor to modify the capture rule based on a source of at least one of the captured electronic messages.

19. The computer readable storage medium of claim 14, further comprising a contacts code segment that causes a processor to access a contact list of the user, wherein the capture rule comprises a contacts parameter requiring capture if at least one source of the electronic message does not correspond to a contact of the contact list.

20. The computer readable storage medium of claim 14, wherein the interface code segment further comprises an alert code segment that causes a processor to generate an unobtrusive audible or visible cue when at least one of the qualifying electronic messages is captured.

21. A computer-implemented method comprising:

receiving electronic messages created by or on behalf of one or more message sources for delivery to a user;

identifying, from among the received electronic messages, qualifying electronic messages that satisfy a capture rule;

capturing a plurality of the qualifying electronic messages;

informing the user of the captured electronic messages;

enabling the user to organize the captured electronic messages according to a plurality of predetermined categories; and enabling the user to manage the captured electronic messages includes messages, comprising:

enabling the user to access information related to a message source of one of the captured electronic messages.

22. The method of claim 21, wherein enabling the user to manage the captured electronic messages further comprises enabling the user to modify the capture rule based on at least one of the captured electronic messages.

23. The method of claim 21, wherein enabling the user to manage the captured electronic messages further comprises enabling the user to modify the capture rule based on a source of at least one of the captured electronic messages.

24. The method of claim 21, wherein identifying qualifying electronic messages that satisfy the capture rule comprises identifying, as qualifying electronic messages, electronic messages in which at least one message source does not correspond to a designated contact of the user.

25. The method of claim 21, wherein enabling the user to manage the captured electronic messages further comprises enabling the user to delete, ignore or block at least one of the captured electronic messages.

* * * * *